(12) United States Patent
Kaneko et al.

(10) Patent No.: US 12,339,597 B2
(45) Date of Patent: Jun. 24, 2025

(54) ELECTRO-CONDUCTIVE MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Shota Kaneko, Tokyo (JP); Yuichi Kikuchi, Shizuoka (JP); Kenji Takashima, Kanagawa (JP); Masahiro Kurachi, Shizuoka (JP); Kazuhiro Yamauchi, Shizuoka (JP); Satoru Nishioka, Shizuoka (JP); Hiroaki Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 725 days.

(21) Appl. No.: 17/711,229

(22) Filed: Apr. 1, 2022

(65) Prior Publication Data
US 2022/0229379 A1     Jul. 21, 2022

Related U.S. Application Data

(63) Continuation of application No. PCT/JP2020/038693, filed on Oct. 14, 2020.

(30) Foreign Application Priority Data

Oct. 18, 2019  (JP) ................................. 2019-191526

(51) Int. Cl.
G03G 15/02     (2006.01)
C08K 3/04      (2006.01)
(Continued)

(52) U.S. Cl.
CPC .......... *G03G 15/0233* (2013.01); *C08K 3/04* (2013.01); *C08K 3/22* (2013.01); *C08K 3/24* (2013.01);
(Continued)

(58) Field of Classification Search
None
See application file for complete search history.

(56) References Cited

U.S. PATENT DOCUMENTS 3,640,708 A    2/1972  Humphriss
5,038,166 A    8/1991  Isaka et al.
(Continued)

FOREIGN PATENT DOCUMENTS

CN    101266443 A    9/2008
CN    101561652 A    10/2009
(Continued)

OTHER PUBLICATIONS

Translation of JP 10-254215.*
(Continued)

*Primary Examiner* — Peter L Vajda
(74) *Attorney, Agent, or Firm* — VENABLE LLP

(57) ABSTRACT

Used is an electro-conductive member for electrophotography including: a support having an electro-conductive outer surface; and an electro-conductive layer on the outer surface of the support, wherein the electro-conductive layer includes: a matrix containing a first crosslinked rubber product and having a volume resistivity greater than $1.0 \times 10^{12}$ Ωcm; and domains dispersed in the matrix, wherein the domain includes a second crosslinked rubber product and an electron conductive agent; and the electro-conductive layer includes a region T in which the volume resistivity of the matrix decreases in a depth direction from the outer surface of the electro-conductive member.

8 Claims, 5 Drawing Sheets

(51) Int. Cl.
*C08K 3/22* (2006.01)
*C08K 3/24* (2006.01)
*C08K 3/26* (2006.01)
*C08L 9/02* (2006.01)

(52) U.S. Cl.
CPC ............ *C08K 3/26* (2013.01); *C08L 9/02* (2013.01); *C08K 2003/2296* (2013.01); *C08K 2003/265* (2013.01); *C08K 2201/001* (2013.01); *C08L 2205/02* (2013.01); *C08L 2205/22* (2013.01)

(56) References Cited

U.S. PATENT DOCUMENTS

| | | | |
|---|---|---|---|
| 5,581,329 | A | 12/1996 | Kosmider |
| 5,643,706 | A | 7/1997 | Brillson |
| 6,070,040 | A | 5/2000 | Goto |
| 7,799,398 | B2 | 9/2010 | Nakamura et al. |
| 8,298,670 | B2 | 10/2012 | Muranaka et al. |
| 8,440,307 | B2 | 5/2013 | Nose et al. |
| 8,449,975 | B2 | 5/2013 | Hirakoso et al. |
| 8,481,167 | B2 | 7/2013 | Watanabe et al. |
| 8,491,994 | B2 | 7/2013 | Harada et al. |
| 8,501,312 | B2 | 8/2013 | Watanabe et al. |
| 8,503,916 | B2 | 8/2013 | Anan et al. |
| 8,532,535 | B2 | 9/2013 | Nose et al. |
| 8,538,298 | B2 | 9/2013 | Harada et al. |
| 8,622,881 | B1 | 1/2014 | Harada et al. |
| 8,628,854 | B2 | 1/2014 | Yamauchi et al. |
| 8,660,472 | B2 | 2/2014 | Kurachi et al. |
| 8,668,987 | B2 | 3/2014 | Yamauchi et al. |
| 8,685,601 | B2 | 4/2014 | Nose et al. |
| 8,715,830 | B2 | 5/2014 | Yamada et al. |
| 8,750,762 | B2 | 6/2014 | Harada et al. |
| 8,771,818 | B2 | 7/2014 | Nishioka et al. |
| 8,852,743 | B2 | 10/2014 | Kikuchi et al. |
| 8,923,732 | B2 | 12/2014 | Harada et al. |
| 8,991,053 | B2 | 3/2015 | Watanabe et al. |
| 9,023,465 | B2 | 5/2015 | Yamada et al. |
| 9,086,643 | B2 | 7/2015 | Kikuchi et al. |
| 9,128,403 | B2 | 9/2015 | Yamauchi et al. |
| 9,146,482 | B2 | 9/2015 | Watanabe et al. |
| 9,360,789 | B1 | 6/2016 | Masu et al. |
| 9,360,833 | B2 | 6/2016 | Terada et al. |
| 9,372,429 | B2 | 6/2016 | Watanabe et al. |
| 9,442,408 | B2 | 9/2016 | Yamauchi et al. |
| 9,442,451 | B2 | 9/2016 | Yamauchi et al. |
| 9,541,854 | B2 | 1/2017 | Kikuchi et al. |
| 9,547,250 | B2 | 1/2017 | Kikuchi et al. |
| 9,551,949 | B2 | 1/2017 | Yamauchi et al. |
| 9,556,359 | B2 | 1/2017 | Suzumura et al. |
| 9,581,931 | B2 | 2/2017 | Yamada et al. |
| 9,599,913 | B2 | 3/2017 | Nishioka et al. |
| 9,639,009 | B2 | 5/2017 | Yamaguchi et al. |
| 9,651,888 | B2 | 5/2017 | Muranaka et al. |
| 9,665,028 | B2 | 5/2017 | Arimura et al. |
| 9,665,029 | B2 | 5/2017 | Hino et al. |
| 9,740,133 | B2 | 8/2017 | Yamauchi et al. |
| 9,811,009 | B2 | 11/2017 | Yamada et al. |
| 9,811,021 | B2 | 11/2017 | Muranaka et al. |
| 9,897,931 | B2 | 2/2018 | Nishioka et al. |
| 9,904,199 | B2 | 2/2018 | Terada et al. |
| 9,910,379 | B2 | 3/2018 | Furukawa et al. |
| 9,958,802 | B2 | 5/2018 | Kikuchi et al. |
| 9,964,914 | B2 | 5/2018 | Arimura et al. |
| 9,977,353 | B2 | 5/2018 | Nishioka et al. |
| 10,018,927 | B2 | 7/2018 | Yamada et al. |
| 10,018,934 | B2 | 7/2018 | Yamada et al. |
| 10,108,129 | B2 | 10/2018 | Yamaguchi et al. |
| 10,146,149 | B2 | 12/2018 | Watanabe et al. |
| 10,280,148 | B2 | 5/2019 | Nishioka et al. |
| 10,317,811 | B2 | 6/2019 | Tomomizu et al. |
| 10,416,588 | B2 | 9/2019 | Masu et al. |
| 10,558,136 | B2 | 2/2020 | Furukawa |
| 10,649,350 | B2 | 5/2020 | Yamaguchi et al. |
| 10,678,154 | B2 | 6/2020 | Takashima et al. |
| 10,678,158 | B2 | 6/2020 | Kikuchi et al. |
| 10,845,724 | B2 | 11/2020 | Kikuchi |
| 10,996,581 | B2 | 5/2021 | Muranaka et al. |
| 11,061,342 | B2 | 7/2021 | Umeda et al. |
| 11,112,719 | B2 | 9/2021 | Makisumi et al. |
| 11,112,748 | B2 | 9/2021 | Yamada et al. |
| 11,137,716 | B2 | 10/2021 | Hiyama et al. |
| 11,169,454 | B2 | 11/2021 | Nishioka et al. |
| 11,175,602 | B2 | 11/2021 | Nishioka et al. |
| 11,307,509 | B2 | 4/2022 | Hino et al. |
| 11,320,756 | B2 | 5/2022 | Kototani et al. |
| 11,340,553 | B2 | 5/2022 | Watariguchi et al. |
| 11,347,156 | B2 | 5/2022 | Kurachi et al. |
| 11,360,405 | B2 | 6/2022 | Tomono et al. |
| 11,360,426 | B2 | 6/2022 | Suzumura et al. |
| 11,366,402 | B2 | 6/2022 | Ishiduka et al. |
| 2002/0022142 | A1 | 2/2002 | Harada |
| 2003/0190540 | A1* | 10/2003 | Shoshi ............ G03G 5/078 430/96 |
| 2005/0227089 | A1 | 10/2005 | Hirakawa |
| 2006/0142131 | A1 | 6/2006 | Iwamura |
| 2008/0226324 | A1 | 9/2008 | Baba |
| 2009/0263168 | A1 | 10/2009 | Baba |
| 2011/0013939 | A1 | 1/2011 | Ono |
| 2012/0224887 | A1 | 9/2012 | Harada |
| 2012/0237863 | A1 | 9/2012 | Wu |
| 2012/0308261 | A1 | 12/2012 | Tsuru et al. |
| 2013/0195517 | A1 | 8/2013 | Jansen |
| 2013/0281276 | A1 | 10/2013 | Watanabe et al. |
| 2014/0072343 | A1 | 3/2014 | Masu et al. |
| 2014/0080691 | A1 | 3/2014 | Kurachi et al. |
| 2014/0219679 | A1 | 8/2014 | Liu |
| 2015/0331346 | A1 | 11/2015 | Yamauchi et al. |
| 2017/0102633 | A1 | 4/2017 | Yoshidome |
| 2020/0310265 | A1 | 10/2020 | Nishioka |
| 2021/0033996 | A1 | 2/2021 | Kikuchi et al. |
| 2021/0116826 | A1 | 4/2021 | Nishida et al. |
| 2021/0116827 | A1 | 4/2021 | Fukudome et al. |
| 2021/0116831 | A1 | 4/2021 | Tominaga et al. |
| 2021/0116859 | A1 | 4/2021 | Unno et al. |

FOREIGN PATENT DOCUMENTS

| | | | | |
|---|---|---|---|---|
| CN | 101587318 A | | 11/2009 | |
| JP | 9-279015 A | | 10/1997 | |
| JP | 10-254215 | * | 9/1998 | ............ G03G 15/02 |
| JP | 10-254215 A | | 9/1998 | |
| JP | 11-202648 A | | 7/1999 | |
| JP | 11-231637 A | | 8/1999 | |
| JP | 2000-29274 A | | 1/2000 | |
| JP | 2001-92221 A | | 4/2001 | |
| JP | 2001-109232 A | | 4/2001 | |
| JP | 2002-3651 A | | 1/2002 | |
| JP | 2001-109232 | * | 2/2002 | ............ G06F 11/22 |
| JP | 2002-108063 A | | 4/2002 | |
| JP | 2005-321764 A | | 11/2005 | |
| JP | 2006-207807 A | | 8/2006 | |
| JP | 2007-163849 A | | 6/2007 | |
| JP | 2011-22410 A | | 2/2011 | |
| JP | 2012-163954 A | | 8/2012 | |
| JP | 2013-20175 A | | 1/2013 | |
| JP | 2016-18154 A | | 2/2016 | |
| JP | 2017-58639 A | | 3/2017 | |
| JP | 2017-72833 A | | 4/2017 | |
| JP | 2018-77347 A | | 5/2018 | |

OTHER PUBLICATIONS

Translation of JP 2001-109232.*
U.S. Appl. No. 17/658,685, filed Apr. 11, 2022, Masaki Yamada.
U.S. Appl. No. 17/658,696, filed Apr. 11, 2022, Kenji Takashima.

* cited by examiner

ELECTRO-CONDUCTIVE MEMBER, PROCESS CARTRIDGE, AND ELECTROPHOTOGRAPHIC IMAGE FORMING APPARATUS

CROSS-REFERENCE TO RELATED APPLICATIONS

This application is a Continuation of International Patent Application No. PCT/JP2020/038693, filed Oct. 14, 2020, which claims the benefit of Japanese Patent Application No. 2019-191526, filed Oct. 18, 2019, both of which are hereby incorporated by reference herein in their entirety.

BACKGROUND

Technical Field

The present disclosure relates to: an electro-conductive member and process cartridge for electrophotography; and an electrophotographic image forming apparatus.

Description of the Related Art

In an image forming apparatus employing an electrophotographic system, an electro-conductive member is used as a charging member and a transfer member. The electro-conductive member is responsible for transporting an electric charge from the electro-conductive support to a surface of the electro-conductive member, and giving the electric charge to an object in contact, by electric discharge, or by triboelectric charging.

The charging member which is one of the electro-conductive members generates the electric discharge between a photosensitive drum and the charging member, and electrically charges a surface of the photosensitive drum. When a minute defect such as a pinhole exists on the surface of the photosensitive drum, an electric field tends to easily concentrate at the abutting portion of the charging member, and excessive charge transport, in other words, abnormal electric discharge tends to easily occur.

When an abnormal electric discharge occurs, the electric charge to be supplied from the electro-conductive support for electrically discharging and electrically charging the whole in the longitudinal direction of the electro-conductive member concentrates in the electric discharge to the minute defect. Because of this, the amount of electric discharge decreases in a region of the same phase in the longitudinal direction, which should be electrically discharged at the same time, and such a phenomenon occurs that the photosensitive drum is not electrically charged there. As a result, in the region of the same phase in the longitudinal direction, which should be electrically discharged at the same time and contains the minute defect, a charged potential decreases; and toner is excessively developed, which appears as a harmful effect of an image of a black band shape, so-called "lateral black band image", in some cases.

In Japanese Patent Application Laid-Open No. 2002-108063, a unit is disclosed which controls a volume resistivity of each layer, in an electro-conductive member having a multilayer film, and suppresses the above abnormal electric discharge.

In Japanese Patent Application Laid-Open No. 2002-108063, a technology is disclosed which sets the volume resistivity of each layer in the electro-conductive member having a multilayer film of an elastic layer and a surface layer (where the combination is also collectively referred to as an electro-conductive layer), and suppresses the abnormal electric discharge. In such a structure, a challenge is to achieve both of suppression of the abnormal electric discharge due to the concentration of the electric field and a charging performance.

Specifically, it has been difficult to achieve both of suppression of the abnormal electric discharge which occurs caused by excessive inflow of the electric charge due to the concentration of the electric field in the defect of the photosensitive drum, and suppression of a lack of the amount of electric discharge, which occurs caused by high resistance for suppressing the excessive inflow of the electric charge.

For example, when the volume resistivity of the surface layer is smaller than that of the elastic layer while the electrical resistance of the whole electro-conductive layer is within an appropriate range, the transport of the excessive electric charge cannot be suppressed, and there is a case where a lateral black band occurs due to the abnormal electric discharge. As another example, when the volume resistivity of the surface layer is larger than the volume resistivity of the elastic layer, the electro-conductive member can exhibit a function of suppressing the transport of the excessive charge, but there is a case where a sufficient electric charge cannot be supplied in time onto the outer surface of the electro-conductive layer, and image defects occur which are derived from a decrease in an amount of electrostatic charge, particularly in high-speed printing.

At least one aspect of the present disclosure is directed to providing an electro-conductive member that has a high electric discharge performance required for a charging member and transfer member for electrophotography, suppresses the abnormal electric discharge and the lateral black band image even for a photosensitive drum having a defect such as a pinhole, and at the same time suppresses a decrease in the amount of electrostatic charge.

Another aspect of the present disclosure is directed to providing a process cartridge that contributes to the formation of a high-quality electrophotographic image, and an electrophotographic image forming apparatus that can form a high-quality electrophotographic image.

SUMMARY

According to one aspect of the present disclosure, there is provided an electro-conductive member for electrophotography, including:
a support having an electro-conductive outer surface; and
an electro-conductive layer on the outer surface of the support, wherein
the electro-conductive layer includes: a matrix containing a first crosslinked rubber product and having a volume resistivity greater than $1.0 \times 10^{12}$ Ωcm; and domains dispersed in the matrix, wherein
the domain includes a second crosslinked rubber product and an electron conductive agent; and the electro-conductive layer includes a region T in which the volume resistivity of the matrix decreases in a depth direction from the outer surface of the electro-conductive member.

Further features of the present disclosure will become apparent from the following description of exemplary embodiments with reference to the attached drawings.

DESCRIPTION OF THE EMBODIMENTS

Figure 1:
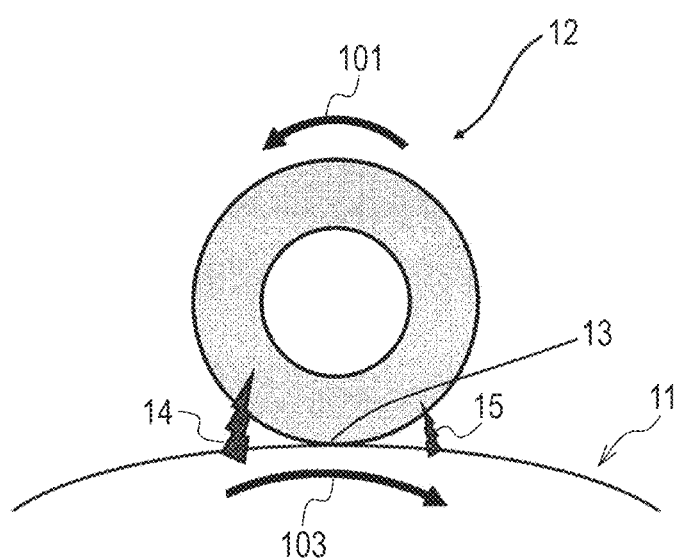
FIG. 1 is a conceptual diagram of the vicinity of an abutting portion between a photosensitive drum and a charging member.

The inventors presume the reason why it is difficult in a charging process of a photosensitive drum having a defect such as a pinhole to achieve both of suppression of the occurrence of an abnormal electric discharge due to a concentration of an electric field to the defect, and suppression of the occurrence of an image defect such as a lateral streak due to a lack of charging, as follows:

The photosensitive drum has a highly resistive photosensitive layer on its surface, in order to maintain the charged potential due to the charging member. The photosensitive drum abuts on other members such as a developing member, a transfer member and a cleaning member in the electrophotographic image forming apparatus (hereinafter also referred to as electrophotographic apparatus). Because of this, a minute defect such as a flaw occurs in the photosensitive drum in some cases, due to an abutting state with another member, or an influence of foreign matter at the abutting portion with another member, in a process of forming an electrophotographic image. Such a defect tends to more easily occur as a process speed of the electrophotographic apparatus is increased and the life thereof is extended.

In addition, the photosensitive layer is formed on a substrate having an electro-conductive surface, in order to connect the photosensitive drum to a ground electrode of a main body of the electrophotographic apparatus. In addition, at a site at which the defect has occurred, a thickness of the photosensitive layer is thinner than that at a site at which the defect does not occur around the site at which the defect has occurred, and accordingly the electric resistance is lower there. Furthermore, at a site at which the defect occurs, the photosensitive layer can be in a state of hardly functioning as a resistor, though depending on a size and depth of the defect in a plane direction.

As a result, a shared voltage greatly decreases at the site of the photosensitive drum, at which the defect has occurred. In other words, in an electrically conducting path in a region of the charging member, which can generate the electric discharge to the defect therethrough, the shared voltage increases and an electric field increases, by an amount corresponding to a decrease in the shared voltage of the defect of the photosensitive drum. Note that in a site of the photosensitive drum in which the defect does not occur, the electric fields in all paths of the electric charge in the electro-conductive member become uniform.

Meanwhile, the behavior of the charging member corresponding to the defect will be described below.

Firstly, in the charging member, an electric charge is supplied through the electro-conductive support connected to a power source; and according to an electric field formed by an applied voltage, the electric charge is transported to the surface of the electro-conductive layer through the inside of the electro-conductive layer, and thereby generates an electric discharge in a minute gap between the charging member and the photosensitive drum.

Here, the electric charge in the electro-conductive path can be expressed by $a=qE/m$ from the equation of motion $F=ma$ and the electrostatic attraction force $F=qE$ which gives the acceleration, and accordingly, the acceleration of the electric charge is proportional to the applied electric field. Accordingly, at a place at which there is the defect (place at which electric field becomes large) of the photosensitive drum, a speed of the electric charge at the time when the electric charge is discharged from the surface of the charging member to the gap as the electric discharge is larger than that in the surrounding non-defect portion.

Furthermore, a conventional charging member has a continuous electro-conductive surface, and a longitudinal region (region in which electric discharge occurs simultaneously) in which distances of the minute gaps between the photosensitive drum and charging member are equal forms an equipotential surface. Accordingly, in the case of an electric discharge which occurs at a position corresponding to the defect on the surface of the charging member, an inflow of a large amount of electric charges occur, due to an influence that an electric field is strongly applied from the whole area in the longitudinal direction. Usually, a size of the defect such as a flaw of a photosensitive drum is 1 mm or smaller in diameter, but a dimension in the longitudinal direction of a general charging member exceeds 200 mm, and accordingly, it is considered that electric charge in an amount of equal to or more than 200 times the usual amount flows into the defect portion.

Next, the electric discharge occurs by the electric charge being discharged from the surface, which is a diffusion phenomenon of electron avalanche in which the electric charge increases exponentially while repeating such a process that the electric charge collides with a molecule in air and an electrode to generate an electron and a positive ion. Accordingly, when a speed of the discharged electric charge on the surface of the charging member is large, the electron avalanche tends to easily become large.

In other words, in the electric discharge toward the defect, it is considered from the above description that the speed of the electric charge discharged from the surface of the charging member becomes excessive due to the concentration of the electric field, and electric charges in an excessive amount enter the defect from the longitudinal direction, and accordingly that the amount of discharged electric charges in the air tends to easily become excessive, which tends to easily cause the abnormal electric discharge.

As a result, an electric charge which can be used for the electric discharge becomes insufficient, in portions other than the defective portion (non-defect portion), in the region in the longitudinal direction (region in which electric discharge occurs simultaneously), in which the distances of the minute gaps between the charging member and the photosensitive drum are equal to each other. Thereby, the charged potential is lowered, and toner in an excessive amount results in being developed. As a result, there is a case where a lateral black streak appears at a position of the electrophotographic image, which corresponds to the abutting portion.

As a unit for suppressing the abnormal electric discharge, for example, a unit of utilizing a high-resistance layer can be considered as in Japanese Patent Application Laid-Open No. 2002-108063. For example, in a case where a high-resistance layer is provided as the outermost surface layer, the surface layer can stop the excessive electric charge transfer, even if the concentration of the electric field to the defect of the photosensitive drum has occurred, and accordingly can suppress the abnormal electric discharge. However, at the time of high-speed printing, the supply of the electric charge to the outer surface cannot catch up with the printing speed.

Here, FIG. 1 illustrates a conceptual diagram in the vicinity of an abutting portion 13 between a photosensitive drum 11 and a charging member 12. When the supply of electric charges does not catch up with a printing speed, an electric discharge 14 becomes insufficient in the gap in the upstream side of the abutting portion 13 between the photosensitive drum 11 and the charging member 12, as illustrated in FIG. 1. As a result, a minute electric discharge 15 occurs also in the gap in the downstream side of the abutting portion 13. The electric discharge in the downstream side of the abutting portion 13 with the photosensitive drum 11 occurs due to a minute potential difference, accordingly tends to be very sparse, and forms a charged lateral streak image that occurs as a sparse streak on the image. For information, an arrow 101 in FIG. 1 illustrates a rotation direction of the charging member 12, and an arrow 103 illustrates a rotation direction of the photosensitive drum.

In addition, examples of another unit for suppressing the abnormal electric discharge include a unit of suppressing an excessive electric charge transfer, by forming a layer other than the outermost surface layer in a charging member having a multilayer film, from a material having higher volume resistivity than that of the outermost surface layer. However, in order to suppress a lack of the amount of the electric discharge, it becomes essential to introduce such a layer that the resistance of the surface layer is lowered. In this case, in the surface of the charging member corresponding to the flaw portion on the photosensitive drum surface, a wraparound of the electric charge occurs in a region having an equal potential in the longitudinal direction, in which the electric discharge should occur at the same time, and a black lateral streak occurs in the electrophotographic image, in some cases.

It is not easy for the charging member to achieve both of suppression of the abnormal electric discharge due to the concentration of the electric field, with respect to the defect such as the flaw in the photosensitive drum, and at the same time, suppression of the occurrence of the image defect such as the charged lateral streak image due to the lack of charging, as described above.

Then, as a result of intensive studies for solving the above problem, the inventors have found that the electro-conductive member can be obtained which can achieve both of suppression of the abnormal electric discharge to the defect and suppression of the occurrence of the charged lateral streak image derived from the lack of the amount of the electric charge, by satisfying the following requirements.

Requirement (1)

The electro-conductive layer includes: a matrix containing a first crosslinked rubber product and having a volume resistivity greater than $1.0 \times 10^{12}$ Ωcm; and a plurality of domains dispersed in the matrix, wherein the domain includes a second crosslinked rubber product and an electron conductive agent.

Requirement (2)

The electro-conductive layer includes a region T in which the volume resistivity of the matrix decreases in a depth direction from the outer surface of the electro-conductive member.

Requirement (1)

Firstly, the requirement (1) will be described below.

As described above, the abnormal electric discharge to the defect occurs because the speed of the electric charge becomes too large, in a process in which the electric charge reaches the surface of the electro-conductive member from the electro-conductive support through the electro-conductive layer. Alternatively, the abnormal electric discharge occurs because an excessive amount of the electric charge flows into the longitudinal region (region in which electric discharge occurs simultaneously) on the surface, in which the distances of the minute gaps between the electro-conductive member and the photosensitive drum are equal. The present inventors consider the process in which the electric charge reaches the surface of the electro-conductive member in the following way. The acceleration of the transfer of the electric charge from the support to the outer surface of the electro-conductive layer can be expressed by the following Expression (A) from the equation of motion and Ohm's law. In the Expression (A), F is an electrostatic attraction force (N), m is a mass of electric charge (g), a is an acceleration of electric charge (m/s$^2$), q is an amount of electric charge (C), E is an electric field (V/m), V is a shared voltage of an electrically conducting path (V), and d is a distance (m) of the electrically conducting path to which the shared voltage is applied.

$$F = m \cdot a = q \cdot E = q \cdot \frac{V}{d} \qquad \text{Expression (A)}$$

Expression (A) means that the acceleration a of the electric charge is proportional to the shared voltage V of the electrically conducting path. In other words, the larger the shared voltage V applied to the electro-conductive portion is, the larger the acceleration of the transfer of the electric charge becomes.

When the volume resistivity of the electro-conductive layer is constant from the support to the outer surface of the electro-conductive layer, the shared voltage applied to the electro-conductive portion is also constant from the support to the outer surface of the electro-conductive layer, and accordingly, the acceleration is also constant. The fact that the acceleration is constant means that the speed of the transfer of the electric charge continues to increase from the support to the outer surface of the electro-conductive layer. Accordingly, when the defect such as the flaw of the photosensitive drum exists and a state occurs in which the electric field is excessively applied thereto, the acceleration becomes large, and the final arrival speed of the electric charge tends to easily become large.

It is very difficult to suppress this acceleration of the electric charge, in the electro-conductive layer which has the electrically conducting path that communicates from the electro-conductive support to the surface of the electro-conductive member. This is because in the state of communication, the acceleration continues irrespective of the volume resistance of the electrically conducting path.

In order to suppress the continuous acceleration of the electric charge, the present inventors have considered that if the electrically conducting path is structured so that the electric charge surely stops temporarily after being accelerated to a certain degree, the structure can effectively suppress the acceleration of the electric charge.

Furthermore, the present inventors have considered that in an electro-conductive layer having a matrix-domain structure which includes electro-conductive domains and an insulative matrix structure, the electric charge moves in the domain that is an electro-conductive phase, and then surely collides with the matrix which is an insulative phase, and accordingly, the electro-conductive layer can temporarily stop the transfer of the electric charge. It is considered that because of this, the electric charge reaches the surface of the electro-conductive member by being transferred between the domains, while the electric charge stays in the electro-conductive domain.

Furthermore, considering from the viewpoint of the shared voltage, the shared voltage of the insulative matrix having a high volume resistivity is large, and the shared voltage of the electro-conductive domain is small. Accordingly, the acceleration of the electric charge in the domain is significantly suppressed, as compared with a structure of the communicating electro-conductive path to which the precisely same shared voltage as the shared voltage of the charging bias is applied.

Specifically, it is essential for the matrix of the insulative phase to have a volume resistivity exceeding $1.0 \times 10^{12}$ Ωcm, in order to suppress the passage of the electric charge through the matrix, and to exhibit the action of temporarily stopping the electric charge.

It is considered that in the matrix-domain structure, at the same time, the electro-conductive domains are independent also on the surface of the charging member, and there is not a portion in which the domains communicate with each other, and accordingly that the inflow of the electric charge resists occurring also on the equipotential plane of the surface.

Accordingly, it is enabled to suppress the inflow of the electric charges from the region in the longitudinal direction, in which the distances of the minute gaps between the charging member and the photosensitive drum are equal (region in which electric discharge occurs simultaneously), in other words, from the equipotential surface, to the defect of the photosensitive drum.

As described above, when the highly resistive layer only stops the electric charge as in Japanese Patent Application Laid-Open No. 2002-108063, a charged lateral streak image occurs due to the lack of the amount of the electrostatic charge. However, the present inventors have found that the matrix-domain structure can suppress the charged lateral streak image as well, at the same time.

The matrix-domain structure allows the domain to express the electro-conductivity by an electronic conductive material, and to increase the amount of the electric charge to be accumulated; and thereby can achieve a state in which the electro-conductive layer allows abundant electric charges to exist in the electro-conductive domains, over the whole layer. Thereby, the abundant electric charges can exist in the domain while the electric charges stay there, which can secure the amount of the electric charges that can participate in the electric discharge. Thereby, when in use as a charging member, a decrease in the amount of the electric discharge, which occurs in the upstream side of the abutting portion with the photosensitive drum can be suppressed, and accordingly a phenomenon in which sparse electric discharge occurs in the downstream side of the abutting portion can be suppressed, and as a result, the charged lateral streak image can be suppressed.

Requirement (2)

Next, requirement (2) will be described below.

As a result of intensive studies, the present inventors have obtained such recognition that there is a case where the lateral black band image cannot be suppressed only by the requirement (1), with respect to a tendency in which a voltage applied to the charging member is increased for the purpose of increasing the amount of the electric discharge per unit time, due to the recent speedup of the electrophotographic apparatus. The present inventors have further considered that it is necessary to control the speed of the electric charge on the outermost surface at the time when the electric charge is discharged from the electro-conductive member, in order to control the formation of the electron avalanche which directly dominates the amount of the discharged electric charge.

The reason is that in the electro-conductive layer, the electric charge has an acceleration in proportion to the shared voltage of the electro-conductive path, and the speed of the electric charge becomes largest at the outermost surface; and that the arrival speed is closely correlated with the discharge of the electric charge, in other words, the electric discharge, at the surface of the electro-conductive member.

As described above, the electric discharge that is caused by the discharge of the electric charge from the surface is a diffusion phenomenon of the electron avalanche in which the electric charge exponentially increases, while repeating a process of colliding with a molecule in air and an electrode to generate electrons and positive ions. In addition, even in the air, the electric charge is accelerated and transported according to the electric field; and when the frequency of collision with the molecule in the air becomes large, and the progress of the electron avalanche becomes too large, the amount of the discharged electric charge increases, and the abnormal electric discharge occurs.

Accordingly, in order to suppress an initial speed of the electric charge during the electric discharge and reduce the subsequent progress of the electron avalanche as much as possible, it is essential to suppress the acceleration of the electric charge on the outermost surface of the electro-conductive member.

In order to suppress the acceleration of the electric charge on the outermost surface of the electro-conductive member, a unit for further reducing the shared voltage may be adopted at the electro-conductive portion of the outermost surface, which the electric charge that is gradually accelerated and transported from the electro-conductive support passes through and reaches.

Here, in the case of a unit of providing an electro-conductive layer on the outermost surface for the purpose of reducing the shared voltage on the outermost surface as in Japanese Patent Application Laid-Open No. 2002-108063, an inflow of the electric charge in the surface direction on the outermost surface occurs as described in requirement (1). Thereby, the abnormal electric discharge occurs, and even if the acceleration can be suppressed, a large amount of the electric charges is involved in the electric discharge, and result in causing the abnormal electric discharge.

In view of the suppression of the inflow of the electric charge on the outermost surface, the present inventors have found that the abnormal electric discharge can be suppressed at a higher level, by such a configuration that the electro-conductive layer has a region T in which the volume resistivity of the matrix gradually decreases in the depth direction from the outer surface of the electro-conductive member, in addition to the requirement (1).

When the volume resistivity of the matrix is gradually reduced from the outermost surface of the electro-conductive layer toward the inside at the outermost surface of the electro-conductive member, the shared voltage of the matrix gradually increases toward the outermost surface of the electro-conductive layer, while the shared voltage of the domain gradually decreases. Thereby, the electro-conductive layer can reduce the acceleration of the electric charge at the outermost surface, while maintaining the capability of supplying the electric charge which passes through the domain and reaches the outermost surface.

Furthermore, the electro-conductive layer can not only suppress the acceleration of the electric charge at the outermost surface, but also enhance an action of temporarily stopping the electric charge, because a difference of the volume resistivity between the matrix and the electro-conductive domain becomes large on the surface. Accordingly, the electro-conductive layer achieves the enhancement of the effect of suppressing the wraparound of the electric charge into the defect of the photosensitive drum on the outer surface of the electro-conductive layer. At the same time, the accumulation efficiency of the electric charges in the electro-conductive domain on the outermost surface is also enhanced, which can further enhance the effect of suppressing the occurrence of the charged lateral streak due to the lack of the amount of the discharged electric charge.

As described above, the electro-conductive layer satisfying the requirement (1) and the requirement (2) can suppress the acceleration of the electric charge in the electro-conductive layer and on the outermost surface, even when the electro-conductive layer is used with the applied voltage increased for speedup, for a long period of time. At the same time, by suppressing the inflow of the electric charge on the outermost surface, the electro-conductive layer can suppress the abnormal electric discharge to the defect of the photosensitive drum. In addition, in the present configuration, the electro-conductive member can be provided that can accumulate abundant electric charges in the electro-conductive layer, accordingly resists causing the lack of the amount of the discharged electric charge, and does not cause the charged lateral streak image.

Figure 2:
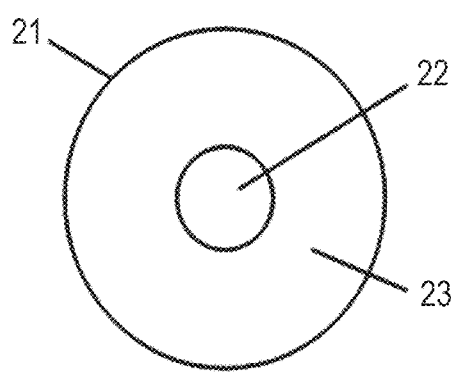
FIG. 2 is a cross-sectional view in a direction perpendicular to a longitudinal direction of an electro-conductive member according to one embodiment of the present disclosure.

The electro-conductive member according to the present embodiment will be described with reference to FIG. 2, taking an electro-conductive member having a roller shape (hereinafter referred to as electro-conductive roller) as an example. FIG. 2 is a cross-sectional view perpendicular to the longitudinal direction which is an axial direction of the electro-conductive roller. The electro-conductive roller 21 has a columnar electro-conductive support 22 and an electro-conductive layer 23 that is formed on the outer periphery of the support 22, in other words, on the outer surface thereof

Electro-Conductive Support

A material constituting the electro-conductive support can be appropriately selected from materials known in the field of the electro-conductive member for electrophotography, and materials usable as the electro-conductive member; and can employ the material. Examples include metals or alloys such as aluminum, stainless steel, a synthetic resin with electro-conductivity, iron and a copper alloy. Furthermore, these materials may be oxidized or plated with chromium, nickel or the like. As for the type of plating, any of electroplating and electroless plating can be used. From the viewpoint of dimensional stability, the electroless plating is preferable. Examples of the type of electroless plating to be used here include nickel plating, copper plating, gold plating, and various type of alloy plating. The plating thickness is preferably 0.05 or larger, and in consideration of a balance between work efficiency and rust prevention capability, the plating thickness is preferably 0.1 μm or larger and 30 μm or smaller. The columnar shape of the support may be a solid columnar shape, or also a hollow columnar shape (cylindrical shape). The outer diameter of the support is preferably in a range of Φ3 mm or larger and Φ10 mm or smaller.

If a medium resistance layer or an insulative layer exists between the support and the electro-conductive layer, the support becomes uncapable of quickly supplying an electric charge after an electric charge has been consumed by the electric discharge. Therefore, it is preferable to provide the electro-conductive layer directly on the support, or to provide the electro-conductive layer on the outer periphery of the support, through only an intermediate layer formed of a thin film and an electro-conductive resin layer, such as a primer.

As the primer, a known primer can be selected and used according to the materials of the rubber material for forming the electro-conductive layer and the support, and the like. Examples of the material of the primer include thermosetting resins and thermoplastic resins; and specifically, materials such as a phenolic resin, a urethane resin, an acrylic resin, a polyester resin, a polyether resin and an epoxy resin can be used.

Electro-Conductive Layer

As an electro-conductive member satisfying the requirement (1) and the requirement (2), it is preferable that the electro-conductive layer satisfy the following configuration (i) to configuration (iii), for example.

Configuration (i): A matrix-domain structure having a plurality of domains that are dispersed in the matrix and contain an electron conductive material.

Configuration (ii): A volume resistivity of the matrix is larger than $1.0 \times 10^{12}$ Ω·cm and $1.0 \times 10^{17}$ Ω·cm or smaller.

Configuration (iii): The matrix-domain structure has a region T in which the volume resistivity of the matrix gradually decreases in a depth direction from the outer surface.

Figure 3:
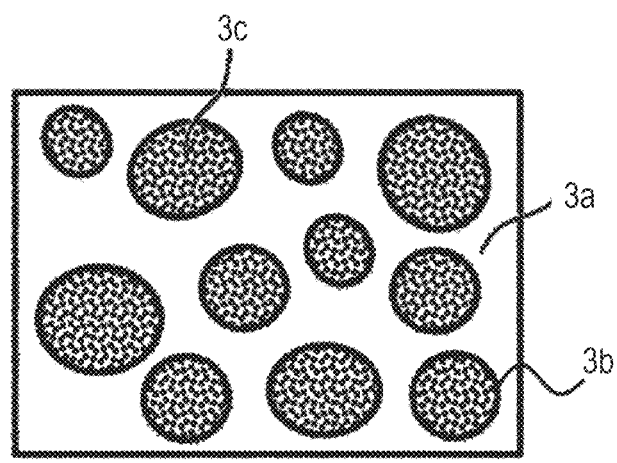
FIG. 3 is a cross-sectional view in a direction perpendicular to the longitudinal direction of the electro-conductive layer of the electro-conductive member according to one embodiment of the present disclosure.

The factors of the above (i) to (iii) will be described below. FIG. 3 illustrates a partial cross-sectional view of the electro-conductive layer in a direction perpendicular to the longitudinal direction of the electro-conductive roller. The electro-conductive layer has a matrix-domain structure having a matrix 3*a* and domains 3*b*. In addition, the domain 3*b* contains electro-conductive particles 3*c* as an electron conductive agent. Suppose that a bias is applied between the electro-conductive support of the electro-conductive member thus having an electro-conductive layer in which domains containing the electron conductive agent are dispersed in the matrix, and a body to be charged. In the electro-conductive layer at this time, it is considered that the electric charge moves from the electro-conductive support side of the electro-conductive layer to the opposite side, in other words, to the outer surface side of the electro-conductive member, in the following way.

Specifically, the electric charge is accelerated and transported according to the shared voltage in the domain, and then stopped in the vicinity of the interface with the matrix. Then, the electric charge is sequentially transferred from the domain located on the electro-conductive support side to the domain located on the side opposite to the electro-conductive support side, and reaches the surface of the electro-conductive layer on the side opposite to the electro-conductive support side (hereinafter also referred to as "outer surface of electro-conductive layer"). In other words, after having been accumulated in the domain, the electric charge is sequentially transferred to the next domain.

Furthermore, due to the domain containing the above electron conductive agent, the electric charge is accumulated in the domain with high efficiency. Because of this, in the electro-conductive layer, many domains each has electric charges abundantly can be arranged, and accordingly can suppress the occurrence of the charged lateral streak image derived from the lack of charging, while the electric charge is stopped step by step.

Furthermore, in order to reduce the shared voltage in the domain to reduce the acceleration of the electric charge, and at the same time, to suppress the excessive flow of the electric charge from the equipotential plane of the surface of the electro-conductive member to the defect of the photosensitive drum, the above configurations (i) to (iii) are necessary.

Configuration (i)

Matrix-Domain Structure

The matrix-domain structure is essential for stopping the electric charge existing in the electro-conductive layer at the interface between the domain and the matrix, and at the same time, suppressing the acceleration of the electric charge in the domain, due to the difference of the volume resistivity between the matrix and the domain.

Furthermore, the function of stopping the electric charge at the domain interface can suppress such a phenomenon that a large amount of electric charges flow toward the defect of the photosensitive drum, in the equipotential plane on the surface of the electro-conductive member, and can suppress the amount of discharged electric charge toward the defect.

In addition, the matrix-domain structure not only suppresses the acceleration of the electric charge due to the high-resistance matrix, but also can accumulate abundant electric charges in the domain, due to the electron conductive agent contained in the domain, and can also suppress the occurrence of the charged lateral streak image derived from the lack of the amount of electrostatic charge.

Method for Checking Matrix-Domain (M-D) Structure

The existence of the matrix-domain structure in the electro-conductive layer can be checked by an operation of producing a thin piece from the electro-conductive layer, and observing the fracture surface formed in the thin piece, in detail.

Examples of the unit for thinning the piece include a sharp razor, a microtome and an FIB. In addition, in order to observe the matrix-domain structure more accurately, the thin piece for observation may be subjected to a pretreatment such as a dyeing treatment or a vapor deposition treatment, by which a contrast between the domain as the electro-conductive phase and the matrix as the insulative phase can be suitably obtained.

The existence of the matrix domain structure can be checked by observation of the fracture surface of the thin piece which has been subjected to the formation of the fracture surface and, if necessary, to the pretreatment, by a laser microscope, a scanning electron microscope (SEM) or a transmission electron microscope (TEM). As a technique which can confirm the matrix-domain structure simply and accurately, the observation by a scanning electron microscope (SEM) is preferable.

By the technique as described above, the thin piece of the electro-conductive layer is obtained, and an image is acquired which is obtained by observing the surface of the thin piece at 1000 times or larger and 10000 times or smaller. After that, the obtained image is converted to that of 8-bit gray scale with the use of a commercially available image processing software such as image software (trade name: ImageProPlus, manufactured by Media Cybernetics, Inc.), and a monochrome image of 256 gradations is obtained. Subsequently, black and white of the image are inverted so that the domain in the fracture surface becomes white, and are binarized; and the analysis image is obtained. The presence or absence of the matrix-domain structure may be determined, based on the analysis image in which the image is processed into such a state that the domains and the matrix are distinguished by binarization.

When the analysis image includes a structure in which a plurality of domains exists in an isolated state in the matrix as illustrated in FIG. 3, the presence of the matrix-domain structure in the electro-conductive layer can be confirmed. The isolated state of the domains may be a state in which each domain is arranged in such a state as not to be connected with another domain, and in which the domains are divided by the matrix, while the matrix is communicated in the image. Specifically, a state having the matrix-domain structure is defined as a state in which when an area within 50 μm square in the analysis image is set as an analysis region, the number of domains existing in an isolated state as described above is 80 number percent or more with respect to the total number of domain groups which do not have a contact point with a frame line of the analysis region.

Above-mentioned confirmation can be performed by: equally dividing the electro-conductive layer of the electro-conductive member into five portions in the longitudinal direction and equally dividing into four portions in the circumferential direction; producing the slices from 20 points in total of arbitrary one point from each region; and performing the above measurement to confirm the presence of the matrix-domain structure in the electro-conductive layer.

Method for Forming Matrix-Domain Structure

Examples of forming the electro-conductive member according to the present embodiment include a method of kneading an electro-conductive rubber particle which forms the domain, into a matrix rubber. In particular, a method including the following steps (i) to (iv) is preferable.

Step (i): preparing a rubber composition for domain formation (hereinafter also referred to as "CMB") which contains carbon black and a second crosslinked rubber product;

Step (ii): preparing a rubber composition for matrix formation (hereinafter also referred to as "MRC") which contains a first crosslinked rubber product;

Step (iii): kneading the CMB with the MRC to prepare a rubber composition having a matrix-domain structure;

Step (iv): forming a layer of the rubber composition prepared in step (iii) on the electro-conductive support directly or through another layer, and curing (cross-linking) the layer of the rubber composition to form the electro-conductive layer according to the present embodiment.

As for the configuration (i), the volume resistivity of the matrix is determined by the composition of the MRC.

As the first rubber to be used in the MRC, rubber with low electro-conductivity is preferable. Specifically, at least one selected from the group is preferable which consists of, for example, natural rubber, butadiene rubber, butyl rubber, acrylonitrile butadiene rubber, urethane rubber, silicone rubber, fluorine rubber, isoprene rubber, chloroprene rubber, styrene butadiene rubber, ethylene propylene rubber, ethylene propylene diene rubber, and polynorbornene rubber.

The first rubber is more preferably at least one selected from the group consisting of butyl rubber, styrene butadiene rubber, and ethylene propylene diene rubber.

In addition, when the volume resistivity of the matrix is within the above range, if necessary, such agents may be added to MRC as a filler, a processing aid, a crosslinking agent, a crosslinking aid, a crosslinking accelerator, a cross-linking accelerating aid, a crosslinking retarder, an anti-aging agent, a softening agent, a dispersing agent and a coloring agent. On the other hand, in order to keep the volume resistivity of the matrix within the above range, the MRC preferably does not contain an electron conductive agent such as carbon black.

Furthermore, as for the configuration (i), it is effective to control the following four items (a) to (d).

(a) A difference between the respective interfacial tensions σ of the CMB and the MRC;
(b) A ratio ($\eta m/\eta d$) between a viscosity of the CMB ($\eta d$) and a viscosity of the MRC ($\eta_m$);
(c) A shear rate (γ) at the time of kneading of the CMB with the MRC, and an energy amount (EDK) at the time of shearing in step (iii);
(d) A volume fraction of the CMB to the kneaded product of the CMB and the MRC in step (iii).

(a) Difference in interfacial tension between the CMB and the MRC

In general, when two types of incompatible rubbers are mixed, phase separation occurs. This is because the interaction between the same macromolecules is stronger than the interaction between different types of macromolecules, and accordingly because the same macromolecules tend to cohere to each other, lower the free energy, and be stabilized.

The interface of the phase-separated structure is in contact with different types of macromolecules, and accordingly the free energy becomes higher than that of the inside which is stabilized by the interaction between the same molecules. As a result, in order to reduce the free energy of the interface, an interfacial tension is generated which attempts to reduce the area in contact with a heterogeneous macromolecule. When the interfacial tension is small, the different types of macromolecules tend to be mixed more uniformly so as to increase the entropy. A state of being uniformly mixed is dissolution, and the SP value (solubility parameter) which is a measure of solubility tends to correlate with interfacial tension.

In other words, it is considered that a difference in the interfacial tension between the CMB and the MRC correlates with a difference in the SP value between the rubbers contained in each of the CMB and the MRC. It is preferable to select such a rubber that the difference between the absolute values of the solubility parameter SP value of the first rubber in the MRC and the SP value of the second rubber in the CMB preferably becomes 0.4 $(J/cm^3)^{0.5}$ or larger and 5.0 $(J/cm^3)^{0.5}$ or smaller, and more preferably becomes 0.4 $(J/cm^3)^{0.5}$ or larger and 2.2 $(J/cm^3)^{0.5}$ or smaller. When the difference is in this range, a stable phase-separated structure can be formed, and the domain diameter of the CMB can be decreased. Specific examples of the second rubber that can be used in the CMB are as follows, and at least one of these can be used.

Here, as specific examples of the second rubber that can be used in the CMB, at least one selected from the group is preferable which consists of natural rubber (NR), isoprene rubber (IR), butadiene rubber (BR), acrylonitrile butadiene rubber (NBR), styrene butadiene rubber (SBR), butyl rubber (IIR), ethylene propylene rubber (EPM), ethylene propylene diene rubber (EPDM), chloroprene rubber (CR), nitrile rubber (NBR), hydrogenated nitrile rubber (H-NBR), silicone rubber and urethane rubber (U).

The second rubber is more preferably at least one selected from the group consisting of styrene butadiene rubber (SBR), butyl rubber (IIR) and acrylonitrile butadiene rubber (NBR), and is further preferably at least one selected from the group consisting of the styrene butadiene rubber (SBR) and the butyl rubber (IIR).

The thickness of the electro-conductive layer is not particularly limited as long as the aimed function and effect of the electro-conductive member can be obtained. The thickness of the electro-conductive layer is preferably 1.0 mm or larger and 4.5 mm or smaller.

The mass ratio of the domain to the matrix (domain: matrix) is preferably 5:95 to 40:60, is more preferably 10:90 to 30:70, and is further preferably 13:87 to 25:75.

Method for Measuring SP Value

The SP values can be calculated accurately by an operation of creating a calibration curve using a material of which the SP value is known. As the known SP value, a value in a catalog of a material maker can be used. For example, the SP values of NBR and SBR do not depend on the molecular weight, and are almost determined by content ratios of acrylonitrile and styrene.

Accordingly, the content ratios of acrylonitrile or styrene in the rubbers constituting the matrix and the domain, are analyzed with the use of an analytical method such as pyrolysis gas chromatography (Py-GC) and solid-state NMR. Thereby, the SP value can be calculated from a calibration curve obtained from the material of which the SP value is known.

In addition, the SP value of the isoprene rubber is determined according to isomeric structures of 1,2-polyisoprene, 1,3-polyisoprene, 3,4-polyisoprene, cis-1,4-polyisoprene, trans-1,4-polyisoprene, and the like. Accordingly, the SP value can be calculated from a material of which the SP value is known, based on the analysis of the content ratio of an isomer by Py-GC, solid-state NMR and the like, in the same manner as in SBR and NBR.

The SP value of a material of which the SP value is known is obtained by the Hansen sphere method.

(b) Viscosity Ratio Between CMB and MRC

The closer the viscosity ratio of the CMB to the MRC (CMB/MRC) ($\eta d/\eta m$) is to 1, the smaller the domain diameter can be made. Specifically, it is preferable that the viscosity ratio be 1.0 or larger and 2.0 or smaller. The viscosity ratio of the CMB to the MRC can be adjusted by the selection of the Mooney viscosity of the raw rubber which is used for each of the CMB and the MRC, and by the type and amount of the filler compounded.

In addition, the viscosity ration can be also adjusted by adding a plasticizing agent such as paraffin oil, in such an extent that the plasticizing agent does not hinder the formation of the phase-separated structure. In addition, the viscosity ratio can be adjusted by adjusting a temperature at the time of kneading.

For information, the viscosities of the rubber mixture for forming the domain and the rubber mixture for forming the matrix can be obtained by measuring the Mooney viscosity $ML_{(1+4)}$ at a rubber temperature at the time of kneading, based on JIS K6300-1: 2013.

Examples of a measuring apparatus for the Mooney viscosity include a Mooney viscometer (trade name: SMV-300 RT, manufactured by Shimadzu Corporation).

(c) Shear rate at the time when the MRC and the CMB are kneaded, and amount of energy at the time of shearing The higher the shear rate at the time when the MRC and the CMB are kneaded, and the larger the energy amount at the time of shearing, the smaller an inter-domain distance can be made.

The shear rate can be increased by increasing an inner diameter of a stirring member such as a blade or a screw of the kneading machine, reducing the gap from the end surface of the stirring member to the inner wall of the kneading machine, or increasing the number of rotations. In addition, the energy at the time of shearing can be increased by increasing the number of rotations of the stirring member, or by increasing the viscosities of the first rubber in the CMB and the second rubber in the MRC.

(d) Volume fraction p of domain (volume fraction p of CMB for kneaded product of CMB and MRC)

The volume fraction p of the CMB to a kneaded product of the CMB and the MRC correlates with the probability of the collision and coalescence of the CMB with respect to the MRC. Specifically, when the volume fraction of the CMB with respect to the kneaded product of the CMB and the MRC is reduced, the probability of the collision and coalescence between the CMB and the MRC decreases. In other words, the inter-domain distance can be reduced by reducing the volume fraction of the domains in the electro-conductive layer, in a range in which the necessary electro-conductivity can be obtained. In addition, it is preferable that the volume fraction p of the domain be controlled to be 15% or larger and 40% or smaller.

Domain Diameter

It is preferable that an arithmetic mean value of an equivalent circle diameter of the domain (hereinafter, also simply referred to as "domain diameter") be controlled to 0.1 µm or larger and 5.0 µm or smaller.

By controlling the average value of the domain diameters to 0.10 µm or larger, the path through which the electric charge moves can be more effectively limited, in the electro-conductive layer. The average value is more preferably 0.15 µm or larger, and is further preferably 0.20 µm or larger.

In addition, by controlling the average value of the domain diameters to 5.0 µm or smaller, the ratio of the surface area to the total volume of the domain, in other words, the specific surface area can be increased exponentially, and the discharge efficiency of the electric charge from the domain can be dramatically improved. From the above reasons, it is preferable for the average value of the domain diameters to be controlled to 2.0 µm or smaller, and further to 1.0 µm or smaller. A method for calculating the domain diameter will be described later.

Distance Between Adjacent Domains (Hereinafter Also Referred to as "Inter-Domain Distance")

It is preferable that the arithmetic mean value of the inter-domain distances be 0.2 µm or larger and 4.0 µm or smaller. In order for the electro-conductive layer of the present disclosure, in which the domains are dispersed in the matrix, to carry sufficient electric charges to the outer surface of the electro-conductive member and discharge the electric charge there, it is preferable that the inter-domain distance be controlled to 4.0 µm or smaller, particularly to 3.0 µm or smaller. On the other hand, in order to reliably divide the domains from each other by the matrix which is an insulating region, thereby to accumulate sufficient electric charges in the domains, and at the same time, not to pass excessive electric charges to the electro-conductive member, it is preferable to control the inter-domain distance to 0.2 µm or larger, and particularly to 0.3 µm or larger. A method for calculating the inter-domain distance will be described later.

Method for Measuring Volume Fraction of Domain

The volume resistivity of the domain can be measured, for example, by operations of: cutting out a thin piece which contains a matrix-domain structure and has a predetermined thickness (for example, 1 µm), from the electro-conductive layer; and bringing a microprobe of a scanning probe microscope (SPM) or an atomic force microscope (AFM) into contact with the domain in the thin piece.

Figure 4A:
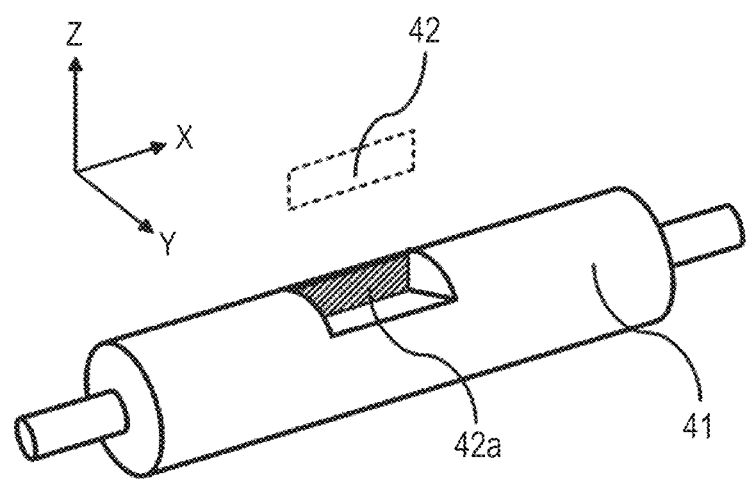
FIG. 4A is an explanatory view of a cross-section cut out direction.
Figure 4B:
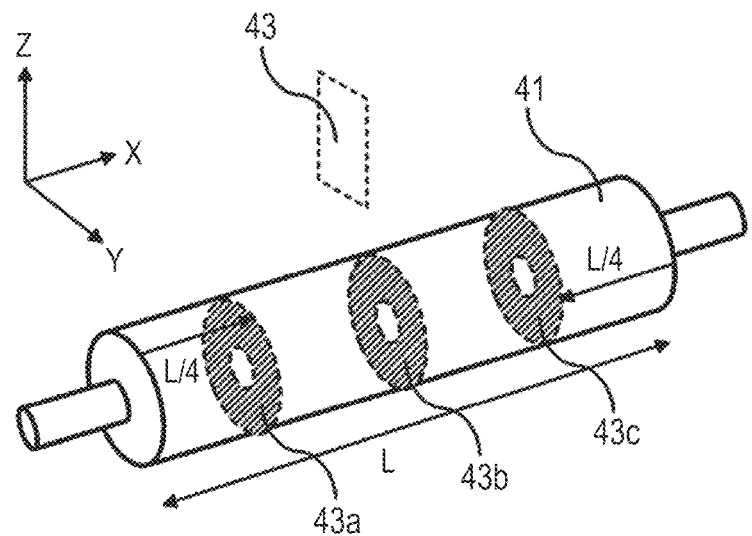
FIG. 4B is an explanatory view of a cross-section cut out direction.

The thin piece is cut out from the elastic layer in such a way that when the longitudinal direction of the electro-conductive member is defined as an X-axis, the thickness direction of the electro-conductive layer is defined as a Z-axis, and the circumferential direction is defined as a Y-axis, for example, as illustrated in FIG. 4A, the thin piece includes at least a part of cross section 42a parallel to an XZ plane. Alternatively, as illustrated in FIG. 4B, the thin piece is cut out in such a way as to include at least a part of a YZ plane (for example, 43a, 43b, 43c) perpendicular to the axial direction of the electro-conductive member. Examples include a sharp razor, a microtome, and a focused ion beam method (FIB).

In the measurement of the volume resistivity, one side of the thin piece is grounded which has been cut out from the electro-conductive layer. Next, a minute microprobe of a scanning probe microscope (SPM) or an atomic force microscope (AFM) is brought into contact with a domain portion of the surface of the thin piece on the side opposite to the ground plane, a DC voltage of 1 V is applied for 5 seconds, an arithmetic mean value is calculated from the ground current values measured for 5 seconds, the applied voltage is divided by the calculated value, and thereby, the electric resistance value is calculated. Finally, the resistance value is converted into the volume resistivity with the use of the thickness of the thin piece. At this time, the SPM or AFM can also measure the thickness of the thin piece simultaneously with the resistance value.

The value of the volume resistivity of the domain in the columnar charging member is determined, for example, by operations of: dividing the electro-conductive layer into four parts in the circumferential direction and five parts in the longitudinal direction; cutting out one thin piece sample from each of the divided regions; obtaining the above measured values; and then calculating an arithmetic mean value from the volume resistivities in total of 20 samples.

Configuration (ii)

Volume resistivity of matrix;

With the volume resistivity of the matrix of larger than $1.0 \times 10^{12}$ Ω·cm and $1.0 \times 10^{17}$ Ω·cm or smaller, the movement of the electric charge which moves around the domain in the matrix can be suppressed. In other words, the electric charge which has been transported in the electro-conductive domain can be temporarily stopped at the interface between the domain and the matrix.

At the same time, the electro-conductive layer can suppress the acceleration of the electric charge in the domain, because the shared voltage of the matrix is large and thereby the shared voltage of the domain can be reduced.

In addition, the volume resistivity of the matrix is controlled to a range of a high-resistance region as described above, and thereby, the electric charge is transmitted while surely staying at the interface of each domain; and thereby, the electro-conductive layer can suppress the acceleration of the electric charge. Furthermore, because a difference in the volume resistivity between the matrix and the domain becomes large, the electro-conductive layer can suppress the inflow of the electric charge into the defect of the photosensitive drum, on the surface of the electro-conductive member. Due to this, the electro-conductive layer the abnormal electric discharge and the lateral black band can be suppressed. In addition, furthermore, because the difference in the volume resistivity between the matrix and the domain becomes large, the electro-conductive layer can accumulate sufficient electric charges in the domain to suppress the lack of the amount of the electrostatic charge, and accordingly can suppress the occurrence of the black lateral streak originating in the charging.

Method for measuring volume resistivity of matrix;

The volume resistivity of the matrix may be measured in the same manner as in the <method for measuring volume resistivity of domain>, except that the measurement place is changed to a place corresponding to the matrix and the applied voltage at the time of measurement of the current value is changed to 50 V.

Configuration (iii)

In addition to suppression of the acceleration of the electric charge in the electro-conductive layer and suppression of the inflow of the electric charge on the surface of the electro-conductive member, it is essential to suppress the progress of the electron avalanche by suppressing the speed of the electric charge to be discharged from the surface of the electro-conductive member. In order to suppress the speed of the electric charge to be discharged from the surface of the electro-conductive member, it is necessary to have a region T in which the volume resistivity of the matrix gradually decreases in the depth direction from the outer surface. In this region T, the volume resistivity of the domain increases from the outer surface toward the depth direction, thereby the shared voltage of the matrix gradually increases toward the outermost surface of the electro-conductive layer, and on the other hand, the shared voltage of the domain gradually decreases, which is preferable.

In addition to having such a region T, it is preferable that when R1 (Ω·cm) represents the volume resistivity of the matrix in a first thickness region having a depth of 5 μm or larger and 6 μm or smaller from the outer surface of the electro-conductive layer, r1 (Ω·cm) represents the volume resistivity of the domain included in the first thickness region, R2 (Ω·cm) represents the volume resistivity of the matrix in a second thickness region having a depth of (t−1) μm or larger and t μm or smaller from the outer surface of the electro-conductive layer, and r2 (Ω·cm) represents the volume resistivity of the domain included in the second region, the following formula (1) is satisfied:

$$R1/r1 > R2/r2 \qquad (1).$$

Method for Confirming Region T

The surface region T in the configuration (iii) (requirement (2)) may be confirmed by cutting out a cross section of the electro-conductive member of the present disclosure, which is a slice in a state of containing the outermost surface portion, and then confirming with a unit capable of two dimensionally mapping the electric resistance value in the depth direction with respect to the cross section.

Firstly, a sample is taken out from the electro-conductive member, and the electric resistance of the thin piece sample can be measured by the microprobe. Examples of a unit for preparing the thin piece include a sharp razor, a microtome and a focused ion beam method (FIB). Among the units, the microtome is preferable. This is because a smooth cross section is formed, and a factor of the surface shape can be eliminated as much as possible in the measurement by the microprobe. As a specific unit for the measurement by the microprobe, it is preferable to use, for example, SPM or AFM which can measure the shape and the electric resistance value by using a micro cantilever.

These methods enable visualization of the distribution of the electric resistance values, by connecting the back side of the slice with respect to the measurement cross section of the slice to the ground electrode, and thereby applying a voltage to the measurement cross section through a microprobe, and scanning the microprobe.

Furthermore, it can be measured by the two-dimensional distribution image of the electric resistance value of the measurement cross section that the volume resistivity of the matrix becomes small in the depth direction from the outermost surface. The change in image density associated with the change in the volume resistivity may be quantified with the use of a commercially available image processing software such as "Imageproplus" (trade name, produced by Media Cybernetics, Inc.), and a point at which the change in the volume resistivity from the outermost surface is saturated may be set as a boundary of the surface region T.

It is preferable that the thickness t of the surface region T be 20 μm or larger and 200 μm or smaller. It is preferable that the thickness t of the surface region T be 20 μm or larger, in order to suppress the wraparound of the electric charge on the surface of the electro-conductive member. On the other hand, in order to suppress that the suppression of the wraparound of the electric charge becomes excessive and the lack of charging occurs, it is preferable that the thickness t of the surface region T be 200 μm or smaller, and in order to suppress an excessive electric current due to the concentration of the electric field, it is more preferable that the thickness t be 100 μm or larger.

Method for Producing Region T

The method for producing the surface region T is not particularly limited as long as the method can modify the electro-conductive layer so that the volume resistivity of the electro-conductive layer becomes smaller in the depth direction from the outer surface of the electro-conductive layer, which is a surface of discharging the electric charge.

Specific examples of the method include surface treatment for the electro-conductive layer and a method of adding a surface-transferable material into the material for forming the electro-conductive layer.

Specific examples include electron beam irradiation and heat treatment which can change the degree of crosslinking of the rubber material that is used in the electro-conductive member. Among the methods, surface treatment by the electron beam irradiation and the heat treatment is preferable. These units have a function of enhancing the degree of crosslinking of the rubber material on the surface of the electro-conductive member which is a rubber roller. The enhancement of the degree of crosslinking of the rubber material means that the free volume of the macromolecule of the rubber material decreases and the volume shrinks extremely slightly. This shrinkage can also be confirmed by measurements of the outer diameter of the electro-conductive member and the like.

On the surface of the electro-conductive member which has shrunk due to a decrease in the free volume of the macromolecule of the rubber material, the mobility of molecules decreases and accordingly the electric resistance value becomes high. Accordingly, also in the electro-conductive member according to the present disclosure, the volume resistivity of the matrix becomes large by the surface treatment which changes the degree of crosslinking by the electron beam irradiation or the heat treatment.

On the other hand, the domain in the electro-conductive layer according to the present disclosure also causes the shrinkage and the increase in the degree of crosslinking, at the same time, but the volume resistivity of the domain decreases, because the distance between the electron conductive agents in the domain decreases, as the rubber shrinks.

In other words, due to the electron beam irradiation or the heat treatment that has been applied to the electro-conductive layer having the configuration of the domain-matrix structure in which the domain has the electron conductive agent and the matrix does not have the electron conductive agent, the surface region T according to the present disclosure can be more effectively formed.

The degree of crosslinking on the surface of the electro-conductive member can be quantified, for example, by the technique of evaluating the mobility of a molecular, which is represented by the T2 relaxation time that can be measured by pulse NMR.

In this way, when the degree of crosslinking of the rubber material is enhanced with respect to the surface of the electro-conductive member that includes the electro-conductive layer based on the electro-conductive domain having the electron conductive agent, and the insulative matrix structure, according to the present disclosure, the surface simultaneously causes the enhancement of the electric resistance of the matrix and the lowering of the electric resistance of the domain.

The thickness t of the surface region T can be controlled by the intensity of the surface treatment as described above. The thickness t of the surface region T can be increased by increasing the intensity of the electron beam irradiation, extending the irradiation time, increasing the temperature of the heat treatment, and extending the heat treatment time.

Volume Resistivity of Domain

The domain is an electro-conductive phase and needs to effectively transport the electric charge in the domain. In addition, for the purpose of increasing the difference in the volume resistivity between the domain and the matrix, in order to reduce the shared voltage applied to the domain, the volume resistivity ρd of the domain is preferably $1.0 \times 10^1$ Ωcm or larger and $1.0 \times 10^4$ Ωcm or smaller. When the volume resistivity is $1.0 \times 10^1$ Ωcm or larger, an increase in the amount of the electric charges to be suppled is suppressed, and an excessive electric current can be suppressed by the electric resistance of the non-electro-conductive matrix. On the other hand, when the volume resistivity is $1.0 \times 10^4$ Ωcm or smaller, the lowering of the speed of transporting the electric charge can be suppressed, and accordingly the transfer of the electric charge necessary for the electric discharge and charging are not suppressed, and the lack of the electric charge can be suppressed.

For information, as previously described, it is preferable to use an electron conductive agent in order to enhance the accumulation efficiency of the electric charge in the domain.

Method for Measuring Volume Resistivity of Domain

The volume resistivity of the domain may be measured by the same measurement method as in the measurement of the volume resistivity of the above matrix.

The volume resistivity as described above is measured by operations of: dividing the electro-conductive layer into four parts in the circumferential direction and five parts in the longitudinal direction; cutting out one thin piece sample from each of the divided regions; obtaining the above measured values; and then calculating an arithmetic average of the volume resistivities in total of 20 samples.

Unit for Achieving Volume Resistivity of Domain

The volume resistivity of the domain can be adjusted by appropriately using an electro-conductive agent and setting its electro-conductivity to a predetermined value. In addition, the volume resistivity of the domain can be adjusted by appropriately selecting the type and amount of the electro-conductive agent to be used.

The domain includes a second crosslinked rubber product and the electron conductive agent.

The matrix has a first crosslinked rubber product as a main component, does not almost contain the electron conductive agent such as carbon black, and has an electric resistance higher than that of the domain.

Examples of the electron conductive agent to be compounded in the domain include: carbon materials such as carbon black and graphite; electro-conductive oxides such as titanium oxide and tin oxide; metals such as Cu and Ag; and particles of which the surfaces are coated with an electro-conductive oxide or a metal and are made electro-conductive. In addition, if necessary, appropriate amounts of two or more of these electron conductive agents may be compounded and used.

In addition, the amount of the electron conductive agent to be compounded in the domain is preferably 10 parts by mass or more and 200 parts by mass or less, with respect to 100 parts by mass of the second rubber. The amount is particularly preferably 20 parts by mass or more and 100 parts by mass or less.

When the amount is in the above range, the volume resistivity of the domain can be easily controlled to a range of $1.0 \times 10^1$ Ω·cm or larger and $1.0 \times 10^4$ Ω·cm or smaller, which is a preferable value in order to enable a sufficient amount of the electric charge to be supplied even under a high-speed process.

Among the electron conductive agents as described above, an electron conductive agent containing electro-conductive carbon black as a main component is preferable, for such reasons that an electrification efficiency is high, the affinity with rubber is high, and a distance between the electron conductive agents is easily controlled. The type of carbon black to be compounded in the domain is not particularly limited.

When the electro-conductive carbon black is used as the electron conductive agent, it is preferable that the electro-conductive carbon black to be compounded in the domain be 20 parts by mass or more and 150 parts by mass or less with respect to 100 parts by mass of the second rubber. The carbon black is particularly preferably 50 parts by mass or more and 100 parts by mass or less. This amount compounded has a feature of being compounded in a relatively large amount, as a general electro-conductive member for electrophotography. The electro-conductivity of the carbon black is formed by a tunneling current that flows between carbon and carbon. The unevenness of the amount of tunneling current correlates with the amount added and the volume occupancy ratio of carbon black occupying in the second rubber, and the higher the ratio, the more the unevenness can be suppressed. Accordingly, within the above range, the unevenness of the electric discharge, in other words, the unevenness of the electric potential of the photosensitive drum, can be effectively suppressed.

In addition, a filler and a bulking agent which are generally used as compounding agents of the rubber may be added to the second rubber that forms the domain, in order to adjust the volume resistance value as in the case of the matrix. As the filler and the bulking agent, materials used for the matrix can be suitably used. In addition, the filler and the bulking agent to be compounded in the domain are preferably 0.1 parts by mass or more and 60 parts by mass or less, with respect to 100 parts by mass of the second rubber, though depending on the volume resistance value of the second rubber to be selected.

As described above, the electro-conductive member satisfying the configuration (i) to the configuration (iii) has been described as a preferable electro-conductive member that satisfies the requirement (1) and the requirement (2), but it is preferable that the electro-conductive member further satisfy the following configuration (iv). The configuration will be described below.

Configuration (iv)

When the length in the longitudinal direction of the electro-conductive layer is represented by L, cross sections in the thickness direction of the electro-conductive layer are determined at three places of the center in the longitudinal direction of the electro-conductive layer, and of L/4 from both ends of the electro-conductive layer toward the center. For each of these cross sections, observation regions each having a 15 μm square are placed at arbitrary three places in a thickness region from the outer surface of the elastic layer to a depth of 0.1 T to 0.9 T. At this time, in 80% or more by number of domains which are observed in each of the nine observation regions in total, a ratio of cross-sectional areas of particles of the electron conductive agent (also referred to as electro-conductive particle) contained in the domains to cross-sectional areas of the domains is 20% or larger.

The above configuration (iv) can be defined as a content of the electro-conductive particles in the domain.

When the amount of the electro-conductive particles filling the domain is as described above, the efficiency of the electric charges to be accumulated in the domain can be enhanced, and the charged lateral streak originating from the lack of the amount of the electrostatic charge can be effectively suppressed.

Method for Measuring Content of Electro-Conductive Particle in Domain

Firstly, a slice is produced in the same manner as in the previously described measurement of the volume resistivity of the matrix. However, as will be described below, it is necessary to produce the slice by a cross section perpendicular to the longitudinal direction of the electro-conductive member, and to evaluate a shape of the domain in the fracture surface of the slice. The reason for this will be described below.

FIGS. 4A and 4B illustrate a figure which illustrates the shape of the electro-conductive member 41 by three axes, specifically, as three dimensions of X, Y and Z axes. In FIGS. 4A and 4B, the X axis indicates a direction parallel to the longitudinal direction (axial direction) of the electro-conductive member, and the Y axis and the Z axis indicate a direction perpendicular to the axial direction of the electro-conductive member.

FIG. 4A illustrates an image view in which the electro-conductive member is cut out at a cross section 42a parallel to an XZ plane 42, with respect to the electro-conductive member. The XZ plane can be rotated 360 degrees around the axis of the electro-conductive member. Considering that the electro-conductive member discharges the electric charge at the time when the electro-conductive member is brought into contact with the photosensitive drum, rotates, and passes through a gap between the electro-conductive member and the photosensitive drum, the cross section 42a parallel to the XZ plane 42 results in indicating a surface on which the electric discharge occurs simultaneously at a certain timing. Due to the passage of a certain amount of a surface corresponding to the cross section 42a, a surface potential of the photosensitive drum is formed.

Accordingly, in order to evaluate the amount of the electro-conductive particles filling the domain, which correlates with the amount of the accumulated electric charges in the electro-conductive member, the following evaluation is necessary. Specifically, it is necessary not to analyze a cross section such as the cross section 42a in which the electric discharge occurs simultaneously at a certain instant, but to evaluate a domain shape in a cross section 43a parallel to a YZ plane 43 illustrated in FIG. 4B, which is perpendicular to the axial direction of the electro-conductive member, and in which a domain shape containing a certain amount of the cross section 42a can be evaluated.

When the length of the electro-conductive layer in the longitudinal direction is represented by L, three places in total are selected which are a cross section 43b in the center in the longitudinal direction of the electro-conductive layer, and two cross sections (43a and 43c) of L/4 from both ends of the electro-conductive layer toward the center.

In addition, regarding the observation positions of the cross sections 43a to 43c, when the thickness of the electro-conductive layer is represented by T, three arbitrary places are determined which are in a thickness region from the outer surface of each slice to a depth of 0.1 T or larger to 0.9 T or smaller. An observation region of 15 μm square may be placed at the three determined places, and the measurement may be performed at nine observation regions in total.

The fracture surface can be formed by a method such as a freeze cracking method, a cross polisher method, or a focused ion beam method (FIB). Considering the smoothness of the fracture surface and pretreatment for observation, the FIB method is preferable. In addition, in order to suitably observe the matrix-domain structure, the slice may be subjected to a pretreatment such as dyeing treatment or vapor deposition treatment, by which a contrast between an electro-conductive phase and an insulative phase can be suitably obtained.

The matrix-domain structure in the slice on which the fracture surface has been formed and the pretreatment has been performed can be observed with a scanning electron microscope (SEM) or a transmission electron microscope (TEM). Among the microscopes, it is preferable to observe the slice with the SEM at a magnification of 1000 times to 100000 times in view of the correctness at the time when the area of the domain is quantified.

«Method for Measuring Cross-Sectional Area Ratio µr of Electro-Conductive Particle in Domain»

The ratio µµr of the cross-sectional areas of the electro-conductive particles in the domain can be measured by quantifying the image photographed in the above description. The image of the fracture surface obtained by the observation with SEM is subjected to image processing with the use of commercially available software such as ImageProPlus (trade name, Media Cybernetics, Inc.), and 9 sheets of images are obtained at the respective observation positions. From each of these images, an analysis region of 15 µm square is extracted, and is subjected to gray scaling of 8 bits; and a monochrome image of 256 gradations is obtained. Subsequently, the black and white of the image are inverted so that the domain in the fracture surface becomes white, the resultant image is binarized, and a binarized image for analysis can be obtained.

The cross-sectional area ratio of electro-conductive particles in the domain can be measured by quantifying the above binarized image. Based on the binarized image, the cross-sectional area S of the domain and the sum Sc of the cross-sectional areas of the portions occupied by the electro-conductive agent in the respective domains are calculated, by the count function in an image processing software (trade name: ImageProPlus, produced by Media Cybernetics, Inc.). Then, the arithmetic mean value (%) of Sc/S is calculated.

In the case of a columnar charging member, when the length of the electro-conductive layer in the longitudinal direction is represented by L, and the thickness of the electro-conductive layer is represented by T, cross sections in the thickness direction of the electro-conductive layer as illustrated in FIG. 4B are obtained from 3 places of the center of the electro-conductive layer in the longitudinal direction, and L/4 from both ends of the electro-conductive layer toward the center. The above measurement is performed in a region of 15 µm square in each of arbitrary three places in the thickness region from the outer surface of the electro-conductive layer to a depth of 0.1 T to 0.9 T in a direction toward the support, in each of the obtained cross sections, and an arithmetic average of the measured values is calculated from nine regions in total.

Process Cartridge

Figure 5:
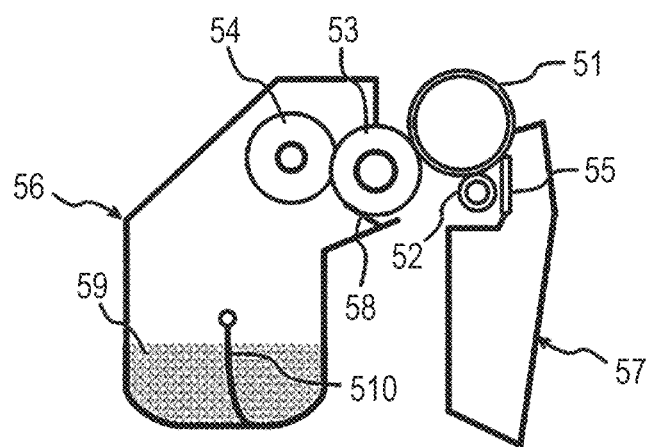
FIG. 5 is a conceptual diagram of a process cartridge.

FIG. 5 illustrates a schematic cross-sectional view of a process cartridge for electrophotography, which includes the electro-conductive member according to the present disclosure as a charging roller. This process cartridge is an apparatus which integrates a developing apparatus with a charging apparatus, and is configured to be detachably attachable to a main body of an electrophotographic apparatus. The developing apparatus is an apparatus which integrates at least a developing roller 53 with a toner container 56, and may include a toner supply roller 54, a toner 59, a developing blade 58 and a stirring blade 510, as needed. The charging apparatus is an apparatus which integrates at least a photosensitive drum 51, a cleaning blade 55, and a charging roller 52, and may include a waste toner container 57. The charging roller 52, the developing roller 53, the toner supply roller 54 and the developing blade 58 are structured so that a voltage is applied to each of the components.

Electrophotographic Apparatus

Figure 6:
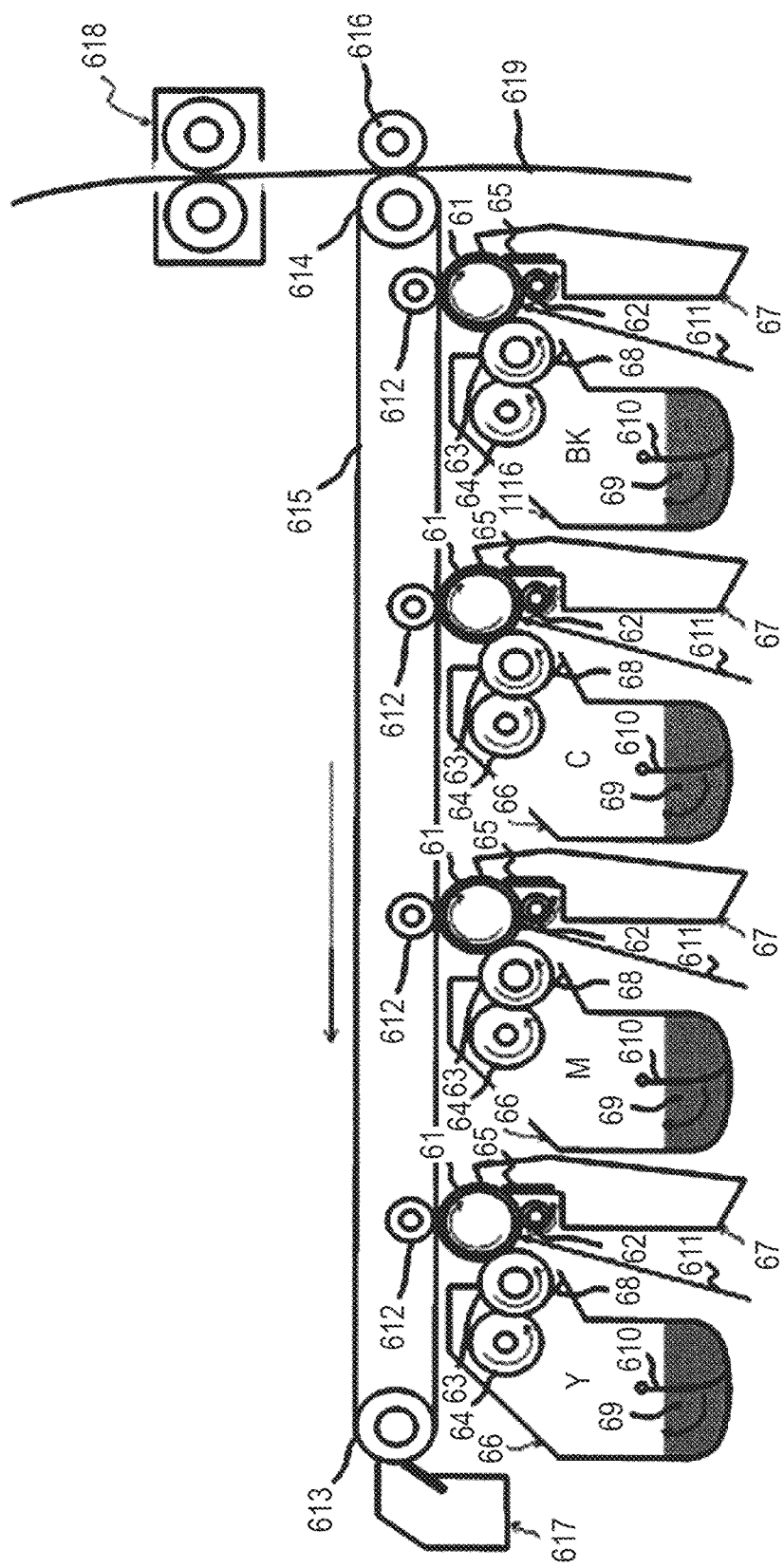
FIG. 6 is a conceptual diagram of an electrophotographic apparatus.

FIG. 6 illustrates a schematic configuration diagram of an electrophotographic apparatus that uses the electro-conductive member according to the present disclosure as the charging roller. The electrophotographic apparatus is a color electrophotographic apparatus on which the four process cartridges are detachably mounted. In each process cartridge, a toner of each color of black, magenta, yellow and cyan is used. A photosensitive drum 61 rotates in the direction of the arrow, and is uniformly charged by a charging roller 62 to which a voltage is applied from a charging bias power source; and an electrostatic latent image is formed on the surface thereof by an exposure light 611. On the other hand, a toner 69 which is stored in the toner container 56 is supplied to a toner supply roller 64 by a stirring blade 610, and is conveyed to a developing roller 63. Then, the surface of the developing roller 63 is uniformly coated with the toner 69 by a developing blade 68 which is arranged so as to come in contact with the developing roller 63, and at the same time, an electric charge is given to the toner 69 by triboelectric charging. The toner 59 is conveyed by the developing roller 63 which is arranged in contact with the photosensitive drum 61, and is given to the photosensitive drum 61; and the above electrostatic latent image is developed by the toner 59 and is visualized as a toner image.

The visualized toner image on the photosensitive drum is transferred to an intermediate transfer belt 615 which is supported and driven by a tension roller 613 and an intermediate transfer belt driving roller 614, by a primary transfer roller 612 to which a voltage is applied by a primary transfer bias power source. The toner images of each color are sequentially superimposed, and a color image is formed on the intermediate transfer belt.

A transfer material 619 is fed into the apparatus by a feed roller, and is conveyed to a space between the intermediate transfer belt 615 and a secondary transfer roller 616. A voltage is applied to the secondary transfer roller 616 from the secondary transfer bias power source, and the color image on the intermediate transfer belt 615 is transferred to the transfer material 619. The transfer material 619 to which the color image has been transferred is subjected to fixing processing by a fixing device 618, and is discharged to the outside of the apparatus; and the printing operation ends.

On the other hand, the toner which has remained on the photosensitive drum without being transferred is scraped off by a cleaning blade 65, and is stored in a waste toner storage container 67; and the cleaned photosensitive drum 61 repeats the above steps. In addition, the toner which has remained on the primary transfer belt without being transferred is also scraped off by a cleaning apparatus 617.

EXAMPLE

Example 1

(1. Production of Unvulcanized Domain Rubber Composition)

[1-1. Preparation of Unvulcanized Domain Rubber Composition]

Materials in amounts shown in Table 1 were mixed with each other by a pressure type kneader, and an unvulcanized domain rubber composition was obtained. As the mixer, a 6-liter pressurizing kneader (product name: TD6-15MDX, manufactured by Toshin Co., Ltd.) was used. The mixing conditions were set at a filling rate of 70 vol %, a number of rotations of the blade of 30 rpm, and a period of 20 minutes.

TABLE 1

Raw material of unvulcanized domain rubber composition

| | Raw material name | Amount compounded (parts by mass) |
|---|---|---|
| Raw rubber (second rubber) | NBR (trade name: Nipol DN302, produced by Zeon Corporation) | 100 |
| Electron conductive agent | Carbon black (trade name: Toka Black #5500 produced by Tokai Carbon Co., Ltd.) | 60 |
| Vulcanization accelerating aid | Zinc oxide (trade name: Zinc White produced by Sakai Chemical Industry Co., Ltd.) | 5 |
| Processing aid | Zinc stearate (trade name: SZ-2000 produced by Sakai Chemical Industry Co., Ltd.) | 2 |

[1-2. Preparation of Unvulcanized Matrix Rubber Composition]

Material in amounts shown in Table 2 were mixed with each other by a pressure type kneader, and an unvulcanized matrix rubber composition was obtained. As the mixer, a 6-liter pressurizing kneader (product name: TD6-15MDX, manufactured by Toshin Co., Ltd.) was used. The mixing conditions were set at a filling rate of 70 vol %, a blade rotation speed of 30 rpm, and a period of 16 minutes.

TABLE 2

Raw materials of unvulcanized matrix rubber composition

| | Raw material name | Amount compounded (parts by mass) |
|---|---|---|
| Raw rubber (first rubber) | NBR (trade name: Nipol DN302, produced by Zeon Corporation) | 100 |
| Filler | Calcium carbonate (trade name: Nanox #30 produced by Maruo Calcium Co., Ltd.) | 40 |
| Vulcanization accelerating aid | Zinc oxide (trade name: Zinc White produced by Sakai Chemical Industry Co., Ltd.) | 5 |
| Processing aid | Zinc stearate (trade name: SZ-2000 produced by Sakai Chemical Industry Co., Ltd.) | 2 |

[1-3. Preparation of Rubber Composition for Forming Electro-Conductive Layer]

Materials to be compounded in the respective amounts shown in Table 3 were mixed with each other in an open roll, and a rubber composition for forming the electro-conductive layer was prepared. As the mixer, an open roll having a roll diameter of 12 inches was used. As for the mixing condition, the number of rotations of the front roll was set at 10 rpm, the number of rotations of the rear roll was set at 8 rpm, and the roll gap was set at 2 mm; left and right were turned back 20 times in total; and then the roll gap was set at 0.8 mm, and tight milling was performed 10 times.

TABLE 3

Rubber composition for forming electro-conductive layer

| | Raw material name | Amount compounded (parts by mass) |
|---|---|---|
| Raw rubber | Unvulcanized domain rubber composition | 30 |
| Filler | Unvulcanized matrix rubber composition | 70 |
| Vulcanizing agent | Sulfur | 3 |
| Vulcanization aid | Tetrabenzylthiuram disulfide (trade name: TBZTD, produced by Sanshin Chemical Industry Co., Ltd.) | 1 |

(2. Production of Electro-Conductive Member)

[2-1. Preparation of Electro-Conductive Support]

As a support, a round bar of free-cutting steel was prepared, which had a total length of 252 mm and an outer diameter of 6 mm, and of which the surface was subjected to electroless nickel plating. The round bar was used as the electro-conductive support.

[2-2. Formation of Electro-Conductive Layer]

A die having an inner diameter of 10.0 mm was attached to the tip of a cross head extruder which had a supply mechanism for an electro-conductive support and a discharge mechanism for an unvulcanized rubber roller, temperatures of the extruder and the cross head were adjusted at 80° C., and a conveyance speed of the electro-conductive support was adjusted to 60 mm/sec. Under the condition, from the extruder, the rubber composition for forming the electro-conductive layer obtained above was supplied, thereby the outer circumferential portion of the electro-conductive support was covered with the rubber composition for forming the electro-conductive layer, in the cross head, and an unvulcanized rubber roller was obtained.

Next, the unvulcanized rubber roller was charged into a hot air vulcanizing furnace at 160° C., and the rubber composition for forming the electro-conductive layer was vulcanized by being heated there for 60 minutes; and a roller was obtained which had an electro-conductive layer formed on the outer circumferential portion of an electro-conductive substrate. After that, both ends of the electro-conductive layer were cut off by 10 mm each, and the length of the electro-conductive layer portion in the longitudinal direction was set at 232 mm.

Finally, the surface of the rubber roller obtained above was polished with the use of a rotary grindstone, and an electro-conductive roller a1 was obtained that was formed into a crown shape in which each diameter at a position of 90 mm from the central portion toward both end portions was 8.44 mm and a diameter at the central portion was 8.5 mm.

[2-3. Surface Treatment of Electro-Conductive Member]

The electro-conductive roller a1 was dried for 60 minutes in a hot-air circulation drier set at a temperature of 200° C., the outer circumferential surface of the roller was surface-modified, and a roller A1 for electrophotography was produced.

(3. Characteristics evaluation)

[3-1. Confirmation of Matrix-Domain Structure]

The presence or absence of the matrix-domain structure in the electro-conductive layer was confirmed by the following method.

A slice was cut out with the use of a razor so that the cross section perpendicular to the longitudinal direction of the electro-conductive layer could be observed. Subsequently, platinum was vapor-deposited on a surface corresponding to the cross section of the electro-conductive layer of the slice. The vapor-deposited surface with platinum was photographed with the use of a scanning electron microscope (SEM) (trade name: S-4800, manufactured by Hitachi High-Technologies Corporation), at 1,000 times, and an SEM image was obtained. In the obtained SEM image, when a structure was confirmed in which a plurality of domains was dispersed in the matrix and the matrices were connected, the matrix-domain structure was determined to be "present". As illustrated in FIG. 3, the roller A1 for electrophotography had a structure in which a plurality of domains 3b were dispersed in the matrix 3a and the matrices were connected to each other.

[3-2. Measurement of Domain Diameter D (Circle Equivalent Diameter of Domain) Observed from Cross Section of Electro-Conductive Layer]

The domain diameter D observed from the cross section of the electro-conductive layer was measured in the following way.

A thin piece having a thickness of 1 μm was cut out from the electro-conductive layer, at a cutting temperature of −100° C., with the use of a microtome (trade name: Leica EMFCS, manufactured by Leica Microsystems K.K.). At this time, the plane of the thin piece was controlled to be perpendicular to the axis of the electro-conductive support. The cut-out positions from the electro-conductive layer were set to three places which were the center in the longitudinal direction and L/4 from both ends of the electro-conductive layer toward the center, where L was the length of the electro-conductive layer in the longitudinal direction. Platinum was vapor-deposited on a surface corresponding to the cross section of the electro-conductive layer of the slice. The vapor-deposited surface with platinum was photographed with the use of a scanning electron microscope (SEM) (trade name: S-4800, manufactured by Hitachi High-Technologies Corporation), at 5000 times, and an SEM image was obtained. Subsequently, the obtained SEM images were each converted into a gray scale of 8 bits with the use of image processing software (trade name: ImageProPlus, produced by Media Cybernetics, Inc.), and a monochrome image with 256 gradations was obtained. Subsequently, the black and white of the image was inverted so that the domain in the monochrome image becomes white, and a threshold value for binarization was set based on an algorithm of Otsu's discriminant analysis method for the luminance distribution of the image; and a binarized image was obtained. Concerning the obtained binarized image, a square observation region having one side of 20 μm was placed in arbitrary three places in a thickness region having a depth of 0.1 Th to 0.9 Th from the outer surface (the surface opposite to the surface facing the support) of the electro-conductive layer, where Th represented the thickness of the electro-conductive layer, and concerning each of 50 arbitrarily selected domains existing in each observation region, the cross-sectional area S was calculated with the use of the count function of the above image processing software. Subsequently, the domain diameter D was calculated from the cross-sectional area S of each domain. Specifically, $D=(4S/\pi)^{0.5}$ was calculated with the use of the area S of the domain. The average value Dave of the calculated domain diameters D was determined as the domain diameter of the roller A1 for electrophotography which was an object to be evaluated.

[3-3. Inter-Domain Distance]

The inter-domain distance was calculated in the following way.

Firstly, each of the three sheets of SEM images obtained in the above 3-2 was subjected to the gray scaling of 8 bits with the use of an image analysis apparatus (trade name: LUZEX-AP, manufactured by Nireco Corporation), and a monochrome image of 256 melodies was obtained. Subsequently, the white and black of the image were inverted so that the domain in the fracture surface becomes white, a threshold value for binarization was set for the luminance distribution of the image, based on the algorithm of the Otsu's discriminant analysis method, and a binarized image was obtained. Based on the binarized image, a square observation region having one side of 20 μm was placed in arbitrary three places in a thickness region having a depth of 0.1 Th to 0.9 Th from the outer surface (the surface opposite to the surface facing the support) of the electro-conductive layer, where Th represented the thickness of the electro-conductive layer, and the arithmetic mean value of the distance between the walls of the domain of each observation region was calculated with the use of the image processing software attached to the above image forming apparatus. Furthermore, the average value of the arithmetic mean values at nine places was calculated, and was determined to be the inter-domain distance of the roller A1 for electrophotography which was an object to be evaluated.

[3-4. Measurement of Volume Resistivity of Matrix]

In order to evaluate the volume resistivity of the matrix contained in the electro-conductive layer, the following measurement was carried out. For information, a scanning probe microscope (SPM) (trade name: Q-Scope250, manufactured by Quesant Instrument Corporation Co., Ltd.) was operated in a contact mode.

Firstly, a slice having a thickness of 1 μm was cut out from the electro-conductive layer of the roller A1 for electrophotography, at a cutting temperature of −100° C., with the use of a microtome (trade name: Leica EMFCS, manufactured by Leica Microsystems K.K.). When the slice was cut out, the direction of the cross-section perpendicular to the longitudinal direction of the electro-conductive member was adopted, in consideration of the direction in which the electric charge is transported for electric discharge.

Next, in an environment of a temperature of 23° C. and a humidity of 50% RH, the slice was placed on a metal plate so that one surface corresponding to the cross section of the electro-conductive layer of the slice came in contact with the surface of the metal plate. Then, a cantilever of the SPM was brought into contact with a place corresponding to the matrix, on the surface of the slice opposite to the surface of the side in contact with the surface of the metal plate; and a voltage of 50 V was applied to the cantilever for 5 seconds, a current value was measured, and an arithmetic mean value in a period of 5 seconds was calculated.

The surface shape of the slice was observed with the SPM, and the thickness of the measurement place was calculated from the obtained height profile. Furthermore, an area of a recessed portion of the contact portion of the cantilever was calculated from the observation result of the surface shape. The volume resistivity was calculated from the thickness and the area of the recessed portion, and was determined to be the volume resistivity of the matrix.

The slices were produced by operations of dividing the electro-conductive layer into five equal parts in the longitudinal direction, dividing the layer into four equal parts in the circumferential direction, and taking the slices from arbitrary one point in the respective regions and of 20 points in total; and were subjected to the above measurement. The average value was determined to be the volume resistivity of the matrix of the roller A1 for electrophotography which was the object to be evaluated.

[3-5. Measurement of Volume Resistivity of Domain]

The volume resistivity of the domain was measured in the same manner as in the measurement method of the volume resistivity of the matrix, except that the contact place of the cantilever was changed to the place corresponding to the domain of the slice in the above 3-4, and the applied voltage to the cantilever was set at 1 V. The average value of the values at each measurement point was determined to be the volume resistivity of the domain of the roller A1 for electrophotography which was the object to be evaluated.

[3-6. Measurement of Thickness t of Region T]

A slice having a thickness of 1 μm was cut out from a region from the outermost surface of the electro-conductive layer of the roller A1 for electrophotography reaching a depth of 800 μm, at a cutting temperature of −100° C., with the use of a microtome (trade name: Leica EMFCS, manufactured by Leica Microsystems K.K.).

Figure 7:
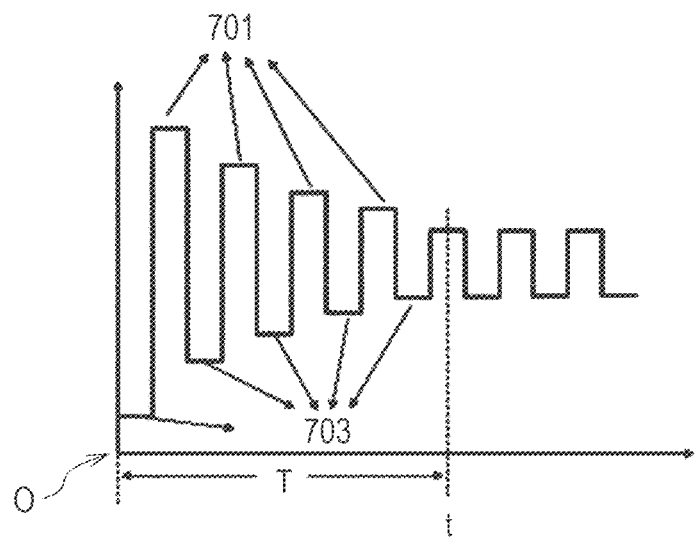
FIG. 7 is a graph in which current values are plotted from the outermost surface of the electro-conductive layer of the electro-conductive member to the depth direction.

Next, in an environment of a temperature of 23° C. and a humidity of 50% RH, the slice was placed on a metal plate so that one surface corresponding to the cross section of the electro-conductive layer came in contact with the surface of the metal plate. Subsequently, the cantilever of the SPM having a current measurement function was brought into contact with the surface of the slice on the opposite side to the surface on the side in contact with the surface of the metal plate, the cantilever was scanned in a state in which a voltage of 50 V was applied to the cantilever, and a current mapping image was acquired. The scanning area was determined as 400 μm square. The obtained current mapping image was subjected to the gray scaling of 8-bits with the use of image processing software (trade name: ImagePro-Plus, produced by Media Cybernetics, Inc.), and a monochrome image of 256 melodies was obtained. From the obtained monochrome image, line profile data of luminance in the depth direction from the outer surface of the electro-conductive layer to the support direction was acquired, and a rectangular wave illustrated in FIG. 7 was formed. The depth position at which the gradient became 0 at the time when the arithmetic mean value of the salient of the formed rectangular wave was plotted against the depth of the electro-conductive layer was determined to be t (um). In FIG. 7, 701 corresponds to the domain and 703 corresponds to the matrix. In addition, the origin O in FIG. 7 corresponds to the outer surface of the roller for electrophotography. The vertical axis represents a current value, and the horizontal axis represents a distance in the depth direction from the outer surface of the roller for electrophotography.

[3-7. Measurement of Volume Resistivity of Matrix-Domain Structure in Region T]

The volume resistivities of the matrix and the domain were determined in the same manner as in [3-4. Measurement of volume resistivity of matrix]. As a measurement place, the place was selected which corresponded to the matrix and the domain existing in the thickness region having a depth of 5 μm or larger and 6 μm or smaller from the outer surface of the roller for electrophotography. The volume resistivity of the obtained matrix was determined to be R1 (Ωcm), and the volume resistivity of the domain was determined to be r1 (Ωcm). Next, based on t determined in [3-6], the volume resistivities of places corresponding to the matrix and the domain were obtained, in the thickness region having a depth of t−1 μm or larger and t μm or smaller from the outer surface of the electro-conductive layer. The volume resistivity of the obtained matrix was determined to be R2 (Ωcm), and the volume resistivity of the domain was determined to be r2 (Ωcm).

Then, the case was evaluated as "Y", where the following relational expression (1) holds, and the case was evaluated as "N", where the relational expression (1) does not hold or where the region T does not exist.

$$R1/r1 > R2/r2 \quad (1)$$

[3-8. Measurement of Domain Volume Fraction]

The volume fraction of domains was calculated by the measurement of the electro-conductive layer in three dimensions, with the use of FIB-SEM. Specifically, a slice image group was acquired by repetition of exposure of a cross section by a focused ion beam and SEM observation, with the use of the FIB-SEM (manufactured by FEI Company Japan Ltd.) (described in detail above).

Subsequently, a three-dimensional image of the electro-conductive layer was constructed with the use of 3D visualizing and analyzing software Avizo (trade name, produced by FEI Company Japan Ltd.), from data of the obtained slice image group. Next, the matrix was distinguished from the domain with the use of a binarization function of the analysis software. Subsequently, the volume of the domains was calculated that were contained in one sample which was arbitrarily selected in the three-dimensional image and had a cubic shape having a side of 10 μm. The above volume fraction of the domains was measured by dividing the electro-conductive member into four parts in the circumferential direction and five parts in the longitudinal direction, cutting out one thin piece sample at an arbitrary place in each of the divided regions, and performing the above measurement; and was calculated from the arithmetic average of the measured values of 20 points in total.

(4. Image Evaluation)

[4-1. Evaluation of Leak Resistance and Observation of Abnormal Electric Discharge at Pinhole]

As an evaluation of the leak resistance of the electro-conductive member, the function of suppressing the abnormal electric discharge to a photosensitive drum in which a pinhole was formed was evaluated in the following way. Firstly, an electrophotographic apparatus (trade name: Laser jet M608dn, manufactured by HP Inc.) was prepared, a photosensitive drum was taken out from the process cartridge, a through hole was formed which had a diameter of 1 mm and reached a metallic base pipe, and a photosensitive drum for evaluation was prepared.

Subsequently, the roller A1 for electrophotography and the photosensitive drum for evaluation were left in an environment of a temperature of 15° C. and a humidity of 10% RH for 48 hours, so as to be familiarized with the measurement environment.

Figure 8:
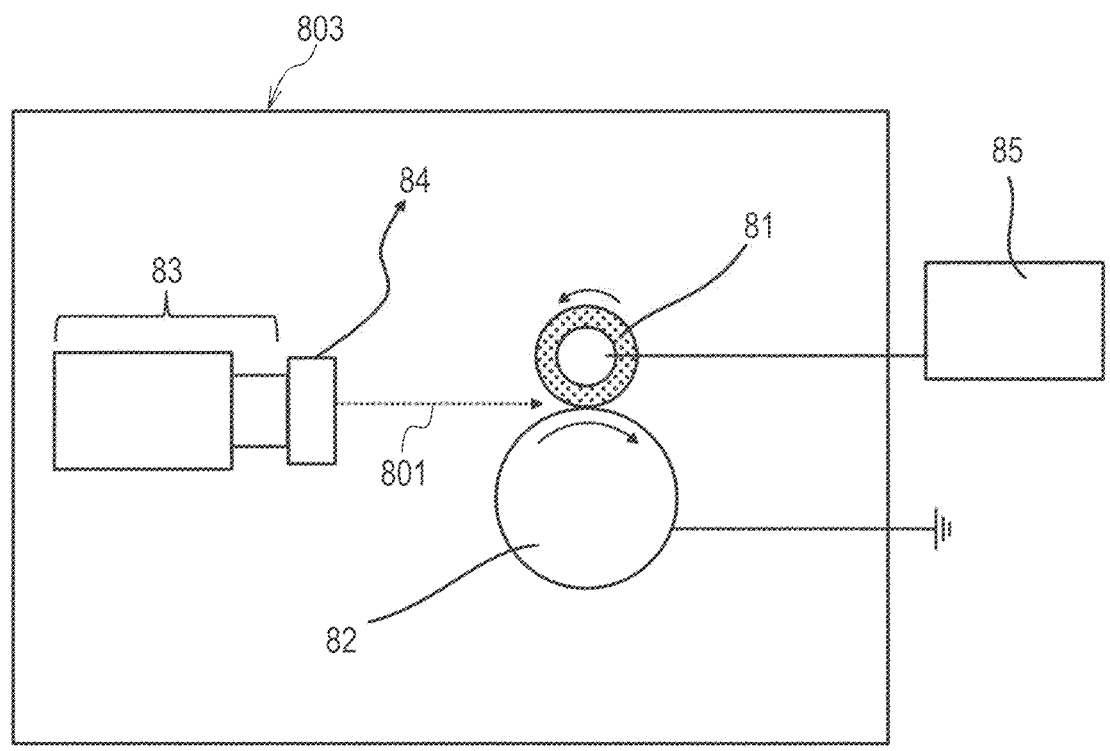
FIG. 8 is a conceptual diagram of an apparatus for observing electric discharge light which is generated in a gap between the photosensitive drum and the charging member.

As illustrated in FIG. 8, a rotatable jig was prepared in which a photosensitive drum 82 for evaluation and a charging member 81 could be brought into contact with each other.

Next, as illustrated in FIG. 8, a high-speed camera 83 (FASTCAMSAS manufactured by Photron Limited) and an image intensifier 84 (C9547-2 manufactured by Hamamatsu Photonics K.K.) were arranged in a container 803 in which light from the outside is blocked, and the electric discharge light was observed which was generated in a gap between the photosensitive drum 82 and the charging member 81, from the direction of the arrow 801.

The observation conditions were measurement under such conditions that the angle of view of the high-speed camera 83 was 1024 pixels×1024 pixels, the frame rate was 1000 fps, and the gain of the image intensifier 84 was 800.

Furthermore, a high-voltage power supply 85 (Trek615-3 manufactured by Trek Japan Inc.) applied and increased a DC voltage to the charging member 81 by 100 V step by step, starting from −1000 V, while the photosensitive drum 82 for evaluation was rotated at a speed of 200 rpm. The charging member 81 is arranged so as to come in contact with the photosensitive drum 82 by a pressing force of 500 g load at both ends. The charging member 81 is driven and rotated according to the rotation of the photosensitive drum 82. In this process, the electric discharge was observed which occurred in a gap between the photosensitive drum 82 for evaluation and the charging member 81. Then, a voltage at which an abnormal electric discharge observed as light more excessive than that in the normal electric discharge occurs in the pinhole portion was measured as a leak resistance voltage.

[4-2. Image Evaluation of Leak Resistance]

An electrophotographic apparatus (trade name: LaserjetM608dn, manufactured by HP Inc.) was prepared. The electrophotographic apparatus was modified so that the number of sheets to be output per unit time became 75 sheets/minute for A4 size paper, which was larger than the original number of sheets to be output, so as to become the evaluation in a high-speed process.

Firstly, the photosensitive drum was taken out from the process cartridge of the electrophotographic apparatus, a through hole (pinhole) was formed which had a diameter of 1 mm and reached a metallic base pipe, and the photosensitive drum for evaluation was prepared.

The roller A1 for electrophotography, the photosensitive drum for evaluation, the electrophotographic apparatus, and the process cartridge were left in an environment of a temperature of 15° C. and a humidity of 10% RH for 48 hours, so as to be familiarized with the measurement environment.

Subsequently, the roller A1 for electrophotography and the photosensitive drum for evaluation were incorporated in the process cartridge as a charging roller and photosensitive drum thereof. With the use of the electrophotographic apparatus, a halftone image was output.

When the leak has occurred in the pin hole, an excessive electric current is generated in the pin hole portion, and the electric discharge runs short in a place (longitudinal direction) at which the electric discharge should occur at the same time. As a result, the lateral streak in which the density became thick due to the lack of the electric discharge occurs in the image, along the axial direction with respect to the position of the pin-hole portion.

In this evaluation, the above halftone image was observed visually and with the use of a loupe, and the presence or absence of the lateral streak originating in the leak in the pinhole and the state thereof were evaluated based on the following criteria.

Rank A: The lateral streak is not observed by visual observation. In addition, the disorder of the dots is not observed even by observation with a loupe.

Rank B: The lateral streak is not observed by visual observation. On the other hand, the disorder of the dots can be confirmed by observation with a loupe.

Rank C: The lateral streaks can be visually confirmed, but do not occur at every cycle of the photosensitive drum.

Rank D: The lateral streaks can be visually confirmed and occur at every cycle of the photosensitive drum.

[4-3. Evaluation of charging capability by observation of electric discharge light]

The charging capability was evaluated by the observation of the electric discharge light in the following way.

Specifically, an observation video of the downstream electric discharge light that occurred at the exit of the abutting portion was obtained in the same manner as in [4-1. Evaluation of leak resistance and observation of abnormal electric discharge at pinhole], except the rotation direction of the photosensitive drum was reversed. Photographing was started after 1 second after the start of the electric discharge, and the photographing time was set at a period of 2 seconds.

In the observation video, the number ratio of frames in which the downstream electric discharge could be observed with respect to all 2000 frames of the observation video was calculated by Imageproplus. The larger the number ratio is, the more remarkably the charging ability runs short, and the lower the level of the charged lateral streak is.

[4-4. Evaluation of Charging Capability]

For forming the evaluation image, the laser printer was used which was used in the above "evaluation of leak resistance". For information, the roller A1 for electrophotography, the laser printer and the process cartridge were left in a low-temperature and low-humidity environment (LL environment) at 15° C./10% RH (relative humidity) for 48 hours, so as to be familiarized with a measurement environment in the same manner as in the above "evaluation of charging capability", and an evaluation image was formed under the same environment. As an electrophotographic photosensitive member (photosensitive drum), an unprocessed product was used.

With the use of the laser printer, a Vd developed image and a half-tone image were output, and evaluated.

Here, the Vd developed image is an image in which under an image output condition for forming a solid white image, the image is developed with toner, instead of being drawn with dots by exposure. Specifically, the Vd developed image is a unit for developing the toner on paper without exposure, by controlling a developing bias by use of an external power supply (Trek615-3 manufactured by Trek Japan Inc.). This unit is an image through which the unevenness of charging can be evaluated more finely than a halftone image which is formed by the control of the dots.

The presence or absence of occurrence of the lateral streak-like defect which originated in the decrease in the charging capability of the charging roller was evaluated according to the following criteria. The evaluation results are illustrated in Table 8.

Rank A: The lateral streak-like image defect is not observed in both the Vd developed image and the halftone image.

Rank B: The lateral streak-like image defect is observed in a part of the Vd developed image, but the lateral streak-like image defect is not observed in the halftone image.

Rank C: The lateral streak-like image defect is observed on the whole surface of the Vd developed image, and the lateral streak-like image defect is observed on a part of the halftone image.

Rank D: The lateral streak-like image defect is observed on the whole surface of the halftone image.

Examples 2 to 20

An unvulcanized domain rubber composition and an unvulcanized matrix rubber composition according to each Example were prepared in the same manner as the unvulcanized domain rubber composition and the unvulcanized matrix rubber composition according to Example 1, except that the types of rubbers of the unvulcanized domain rubber composition and unvulcanized matrix rubber composition, and the type and amount of electro-conductive particle to be added were changed as shown in Table 4-1. In Table 4-1, the difference between SP values of the first rubber and the second rubber, and the viscosity ratio ($\eta d/\eta m$) are also shown collectively.

In addition, a rubber composition for forming an electro-conductive layer according to each Example was prepared in the same manner as the rubber composition for forming the electro-conductive layer according to Example 1, except that a mixing ratio between the obtained unvulcanized domain rubber composition and unvulcanized matrix rubber composition was set to each value shown in Table 4-1, and the types of the vulcanizing agent and vulcanizing accelerator and the amounts thereof compounded were set as shown in Table 4-1. For information, in Table 4-1, the amounts of the vulcanizing agent and the vulcanization accelerator compounded (phr) are amounts compounded with respect to 100 parts by mass of the mixture of the unvulcanized matrix rubber composition and the unvulcanized domain rubber composition.

Rollers A2 to A20 for electrophotography were produced by forming an electro-conductive layer in the same manner as in Example 1, except that the obtained rubber composition for forming the electro-conductive layer was used and the temperature and time of the surface treatment were set as shown in Table 4-2. For information, the details of the materials according to the abbreviated names in Table 4-1 are shown in Table 5.

The evaluation results of the electro-conductive members according to Examples 1 to 20 are shown in Tables 6-1 and 6-2.

TABLE 4-1

| | | Unvulcanized matrix rubber composition (MRC) | | | Unvulcanized domain rubber composition (CMB) | | | | | | Mixing ratio | Vulcanizing agent | | Vulcanization accelerator | |
|---|---|---|---|---|---|---|---|---|---|---|---|---|---|---|---|
| | | First rubber | | Filler | Second rubber | | Electro-conductive particle | | | | (mass ratio) | Abbre- | | Abbre- | |
| | | Type of rubber | Abbreviated name | Abbreviated name phr | Type of rubber | Abbreviated name | Abbreviated name | phr | Difference between SP values | Viscosity ratio ($\eta d/\eta m$) | CMB/MRC | viated name of material | phr | viated name of material | phr |
| Example | 1 | SBR | A303 | #30 40 | NBR | DN302 | #5500 | 60 | 1.4 | 1.7 | 30/70 | Sulfur | 3 | TBZTD | 1 |
| | 2 | | | #30 40 | | | | 70 | 1.4 | 1.8 | 15/85 | Sulfur | 3 | TBZTD | 1 |
| | 3 | | | #30 40 | | | | 55 | 1.4 | 1.6 | 45/55 | Sulfur | 3 | TBZTD | 1 |
| | 4 | | | #30 40 | | N260S | #7360 | 50 | 0.2 | 1.3 | 30/70 | Sulfur | 3 | TBZTD | 1 |
| | 5 | | | #30 40 | | | | 50 | 0.2 | 1.3 | 45/55 | Sulfur | 3 | TBZTD | 1 |
| | 6 | | | #30 40 | | DN302 | #5500 | 60 | 1.4 | 1.7 | 30/70 | Sulfur | 3 | TBZTD | 1 |
| | 7 | | | #30 40 | | | | 60 | 1.4 | 1.7 | 30/70 | Sulfur | 3 | TBZTD | 1 |
| | 8 | | | #30 40 | | | | 60 | 1.4 | 1.7 | 30/70 | Sulfur | 3 | TBZTD | 1 |
| | 9 | | | #30 40 | | | | 60 | 1.4 | 1.7 | 30/70 | Sulfur | 3 | TBZTD | 1 |
| | 10 | | | #30 40 | | | | 70 | 1.4 | 1.8 | 15/85 | Sulfur | 3 | TBZTD | 1 |
| | 11 | | | #30 40 | | | | 65 | 1.4 | 1.8 | 20/80 | Sulfur | 3 | TBZTD | 1 |
| | 12 | | | #30 40 | | | | 55 | 1.4 | 1.6 | 40/60 | Sulfur | 3 | TBZTD | 1 |
| | 13 | | T2000R | #30 40 | | | | 60 | 1.8 | 1.6 | 30/70 | Sulfur | 3 | TBZTD | 1 |
| | 14 | | T1000 | #30 40 | | | | 60 | 2.0 | 1.7 | 35/65 | Sulfur | 3 | TBZTD | 1 |
| | 15 | BR | BR130B | #30 40 | SBR | A303 | #7360 | 80 | 0.6 | 2.2 | 35/65 | Sulfur | 3 | TBZTD | 1 |
| | 16 | IR | IR2200 | #30 40 | NBR | N220S | #5500 | 60 | 3.8 | 1.2 | 30/70 | Sulfur | 3 | TBZTD | 1 |
| | 17 | | | #30 40 | | | | 60 | 3.8 | 1.2 | 30/70 | Sulfur | 3 | TBZTD | 1 |
| | 18 | | | #30 40 | SBR | A303 | #7360 | 80 | 0.6 | 1.1 | 30/70 | Sulfur | 3 | TBZTD | 1 |
| | 19 | | | #30 40 | | | | 80 | 0.6 | 1.1 | 20/80 | Sulfur | 3 | TBZTD | 1 |
| | 20 | | | #30 40 | NBR | N220S | #5500 | 60 | 3.8 | 1.2 | 30/70 | Sulfur | 3 | TBZTD | 1 |

TABLE 4-2

| | | Surface treatment conditions (temperature, time) |
|---|---|---|
| Example | 1 | 200° C. 60 minutes |
| | 2 | |
| | 3 | |
| | 4 | |
| | 5 | |
| | 6 | 210° C. 70 minutes |
| | 7 | 200° C. 70 minutes |
| | 8 | 200° C. 50 minutes |
| | 9 | 180° C. 45 minutes |
| | 10 | |
| | 11 | 200° C. 60 minutes |
| | 12 | |
| | 13 | |
| | 14 | |
| | 15 | |
| | 16 | |
| | 17 | 200° C. 70 minutes |
| | 18 | 200° C. 50 minutes |
| | 19 | 200° C. 60 minutes |
| | 20 | 200° C. 60 minutes |

TABLE 5

| Abbreviated name of material | Material name | Trade name | Manufacturer name |
|---|---|---|---|
| DN302 | Acrylonitrile butadiene rubber (NBR) | Nipol DN302 | Produced by Zeon Corporation |
| N260S | Acrylonitrile butadiene rubber (NBR) | JSR N260S | Produced by JSR Corporation |
| N220S | Acrylonitrile butadiene rubber (NBR) | JSR N220S | Produced by JSR Corporation |
| N230SV | Acrylonitrile butadiene rubber (NBR) | JSR 230SV | Produced by JSR Corporation |
| Esprene505A | Ethylene propylene diene rubber (EPDM) | Esprene505A | Produce by Sumitomo Chemical Company Limited. |
| A303 | Styrene butadiene rubber (SBR) | Asaprene 303 | Produce by Asahi Kasei Corp. |
| T2000R | Styrene butadiene rubber (SBR) | Tufdene 2000R | Produce by Asahi Kasei Corp. |
| T1000 | Styrene butadiene rubber (SBR) | Tufdene 1000 | Produce by Asahi Kasei Corp. |
| T2003 | Styrene butadiene rubber (SBR) | Tufdene 2003 | Produce by Asahi Kasei Corp. |
| BR130B | Butadiene rubber (BR) | UBEPOL BR130B | Produced by Ube Industries, Ltd. |
| IR2200 | Isoprene rubber (IR) | Nipol 2200 | Produced by Zeon Corporation |
| CG102 | Epichlorohydrin rubber (ECO) | Epichromer CG102 | Produced by Osaka Soda Co., Ltd. |
| #7360 | Electro-conductive carbon black | TOKABLACK#7360SB | Produced by Tokai Carbon Co., Ltd. |
| #5500 | Electro-conductive carbon black | TOKABLACK#5500 | Produced by Tokai Carbon Co., Ltd. |
| Ketjen | Electro-conductive carbon black | Carbon EC300J | Produced by Lion Specialty Chemicals Co., Ltd. |
| LV | Ion conductive agent | ADK CIZER LV-70 | Produced by ADEKA Corporation |
| Sulfur | Sulfur | SULFAX PMC | Produced by Tsurumi Chemical Industry Co., Ltd. |
| TBZTD | Tetrabenzylthiuram disulfide | Sanceler TBZTD | Produced by Sanshin Chemical Industry Co., Ltd. |

TABLE 6-1

| Evaluation items | | 3-1 Presence or absence of M-D structure | 3-2 Domain D (μm) | 3-3 Inter-domain distance (μm) | 3-4 Matrix volume resistivity (Ω·cm) | 3-5 Domain volume resistivity (Ω·cm) | 3-6 Thickness t (μm) of region T | 3-7 R1 volume resistivity (Ω·cm) | r1 volume resistivity (Ω·cm) | R2 volume resistivity (Ω·cm) | r2 volume resistivity (Ω·cm) | Relationship of volume resistivity in region T | 3-8 Domain volume fraction P (%) |
|---|---|---|---|---|---|---|---|---|---|---|---|---|---|
| Example | 1 | Present | 1.7 | 1.1 | 4.90E+12 | 5.01E+02 | 101 | 6.72E+14 | 8.91E+01 | 4.88E+12 | 5.01E+02 | Y | 23.5 |
| | 2 | Present | 1.9 | 1.0 | 4.86E+12 | 3.43E+02 | 99 | 2.43E+14 | 5.48E+01 | 4.84E+12 | 5.43E+02 | Y | 16.5 |
| | 3 | Present | 2.1 | 1.9 | 4.89E+12 | 6.12E+02 | 95 | 3.08E+14 | 8.87E+01 | 4.87E+12 | 8.12E+02 | Y | 36.3 |
| | 4 | Present | 0.8 | 0.5 | 4.93E+12 | 3.66E+05 | 112 | 7.48E+14 | 3.61E+04 | 4.90E+12 | 3.66E+05 | Y | 28.6 |
| | 5 | Present | 0.6 | 0.4 | 4.92E+12 | 3.68E+05 | 88 | 1.39E+14 | 3.57E+04 | 4.90E+12 | 4.22E+05 | Y | 21.6 |
| | 6 | Present | 1.9 | 1.4 | 4.92E+12 | 4.75E+02 | 321 | 2.12E+14 | 3.21E+01 | 4.89E+12 | 4.75E+02 | Y | 23.6 |
| | 7 | Present | 2.3 | 1.9 | 4.89E+12 | 4.73E+02 | 198 | 4.91E+14 | 4.15E+01 | 4.87E+12 | 6.68E+02 | Y | 28.2 |
| | 8 | Present | 2.4 | 2.1 | 4.87E+12 | 4.79E+02 | 23 | 2.62E+14 | 4.17E+01 | 4.85E+12 | 4.75E+02 | Y | 30.3 |
| | 9 | Present | 3.1 | 2.1 | 4.90E+12 | 4.82E+02 | 11 | 8.95E+14 | 2.00E+01 | 4.88E+12 | 6.96E+02 | Y | 28.2 |
| | 10 | Present | 2.2 | 3.0 | 4.92E+12 | 3.94E+02 | 16 | 5.23E+14 | 2.10E+01 | 4.90E+12 | 3.94E+02 | Y | 16.6 |
| | 11 | Present | 2.7 | 2.4 | 4.90E+12 | 6.34E+02 | 94 | 4.50E+14 | 6.93E+01 | 4.87E+12 | 1.34E+02 | Y | 21.2 |
| | 12 | Present | 2.1 | 2.1 | 4.94E+12 | 8.08E+02 | 98 | 8.89E+14 | 3.47E+01 | 4.91E+12 | 8.08E+02 | Y | 34.3 |
| | 13 | Present | 2.3 | 1.8 | 7.86E+13 | 4.67E+02 | 96 | 7.42E+15 | 4.42E+01 | 7.86E+13 | 3.77E+02 | Y | 25.9 |
| | 14 | Present | 2.5 | 2.2 | 8.51E+14 | 4.83E+02 | 88 | 5.83E+16 | 1.59E+01 | 8.51E+14 | 8.16E+02 | Y | 26.6 |
| | 15 | Present | 2.5 | 1.8 | 3.33E+15 | 6.20E+01 | 120 | 3.94E+16 | 8.12E+00 | 3.33E+15 | 3.20E+01 | Y | 28.1 |
| | 16 | Present | 2.9 | 2.4 | 3.70E+15 | 3.20E+01 | 145 | 6.98E+16 | 8.60E+00 | 3.70E+15 | 2.68E+01 | Y | 23.5 |
| | 17 | Present | 2.9 | 2.3 | 3.68E+15 | 3.28E+01 | 189 | 6.97E+16 | 6.94E+00 | 3.68E+15 | 6.80E+01 | Y | 26.5 |
| | 18 | Present | 0.8 | 0.9 | 3.73E+15 | 6.13E+01 | 23 | 6.98E+16 | 6.80E+00 | 3.73E+15 | 5.53E+01 | Y | 22.4 |
| | 19 | Present | 0.8 | 0.8 | 3.69E+15 | 6.16E+01 | 132 | 6.93E+16 | 7.73E+00 | 3.69E+15 | 8.46E+01 | Y | 17.8 |
| | 20 | Present | 2.8 | 2.4 | 3.72E+15 | 3.20E+01 | 82 | 6.94E+16 | 8.56E+00 | 3.72E+15 | 1.90E+01 | Y | 32.9 |

TABLE 6-2

| Evaluation items | | 4-1 Leak resistance | | 4-3 Charging performance | |
|---|---|---|---|---|---|
| | | Voltage (V) | Rank of image evaluation | Ratio of downstream electric discharge | Rank of image evaluation |
| Example | 1 | 2000 | A | 1.00.E−03 | A |
| | 2 | 1800 | B | 2.15.E−02 | B |
| | 3 | 1600 | C | 5.50.E−03 | A |
| | 4 | 1700 | C | 4.25.E−02 | B |
| | 5 | 1600 | C | 3.10.E−02 | B |
| | 6 | 2200 | A | 1.11.E−01 | C |
| | 7 | 1900 | B | 5.25.E−02 | B |
| | 8 | 1900 | B | 2.60.E−02 | B |
| | 9 | 1600 | C | 1.50.E−03 | A |
| | 10 | 1500 | C | 1.10.E−01 | C |
| | 11 | 1900 | B | 1.63.E−01 | C |
| | 12 | 1700 | B | 3.00.E−03 | A |
| | 13 | 1800 | B | 2.50.E−03 | A |
| | 14 | 1800 | B | 2.10.E−02 | B |
| | 15 | 1800 | B | 2.15.E−02 | B |
| | 16 | 2100 | A | 1.65.E−01 | C |
| | 17 | 2200 | A | 1.49.E−01 | C |
| | 18 | 2000 | A | 3.55.E−02 | B |
| | 19 | 2100 | A | 1.18.E−01 | C |
| | 20 | 1900 | B | 3.25.E−02 | B |

Comparative Example 1

[Preparation of Rubber Composition for Forming Electro-Conductive Layer]

The materials shown in the following Table 7 were mixed in an open roll, and a rubber composition for forming an electro-conductive layer according to the present Comparative Example was prepared. An electro-conductive roller Cal was produced in the same manner as the electro-conductive roller al of Example 1, except that the rubber composition for forming this electro-conductive layer was used.

TABLE 7

| Material type | Trade name | Amount compounded (parts by mass) |
|---|---|---|
| Epichlorohydrin rubber (EO-EP-AGE ternary cocompound) | Trade name: Epichromer CG102, produced by Osaka Soda Co., Ltd., SP value: 18.5 (J/cm$^3$)$^{0.5}$ | 100 |
| Reinforcing agent: calcium carbonate | Trade name: Nanox #30, manufactured by Maruo Calcium Co., Ltd. | 60 |
| Electro-conductive agent: Ion conductive agent | Trade name: ADK CIZER LV-70, manufactured by ADEKA Corporation | 2 |
| Plasticizer: Aliphatic polyester plasticizer | Trade name: Polycizer P-202, produced by DIC Corporation | 10 |
| Vulcanization accelerator: Zinc oxide | Trade name: Zinc oxide, 2 types, produced by Sakai Chemical Industry Co., Ltd. | 5 |
| Processing aid: Zinc stearate | Trade name: SZ-2000, produced by Sakai Chemical Industry Co., Ltd. | 1 |
| Vulcanizing agent: Sulfur | Trade name: SULFAX PMC, sulfur content 97.5% by mass, produced by Tsurumi Chemical Industry Co., Ltd. | 0.5 |
| Tetramethylthiuram monosulfide | Trade name: Nocceller TS, produced by Ouchi Shinko Chemical Industrial Co., Ltd. | 1 |
| 2-mercaptobenzimidazole | Trade name: Nocrac MB, produced by Ouchi Shinko Chemical Industrial Co., Ltd. | 1 |

[Preparation of Coating Liquid CS1 for Surface Layer]

A resin mixture was prepared by mixing a melamine resin (trade name: AMIDIR G821-60, produced by DIC Corporation) and polyester (trade name: BYRON 30SS, produced by Toyobo Co., Ltd.) at a mass ratio of 35:65.

A coating liquid CS1 for the surface layer according to the present Comparative Example was prepared by adding 8 parts by mass of a fluororesin (trade name: Lublon L-2, produced by Daikin Industries, Ltd.) as a filler and 25 parts by mass of carbon black (trade name: FW200, produced by Cabot Corporation) as an electro-conductive agent, to 100 parts by mass of the resin mixture.

[Production of Roller CA1 for Electrophotography]

An electro-conductive roller Cal was dipped in and coated with the coating liquid CS1 for the surface layer, the resultant roller was heated at a temperature of 160° C. for 30 minutes, and a roller CA1 for electrophotography was produced.

The obtained roller CA1 for electrophotography was evaluated in the same manner as in Example 1.

For information, the roller CA1 for electrophotography was not subjected to evaluations [3-2], [3-3], [3-5] and [3-8], because the electro-conductive layer did not constitute a clear matrix-domain structure. In addition, the roller CA1 was not subjected to the measurement of the volume resistivity according to the evaluations [3-6] and [3-7], because the surface region T also did not exist in the electro-conductive layer.

The roller CA1 for electrophotography according to the present Comparative

Example is different from the roller for electrophotography according to the present disclosure in a point that the electro-conductive layer does not constitute the outer surface of the roller for electrophotography. The rank of the image evaluation according to the evaluation [4-2] of the roller CA1 for electrophotography according to the present Comparative Example was the rank C. The reason is considered to be because the roller CA1 for electrophotography cannot have suppressed the wraparound of the electric charge on the outer surface. In addition, the rank of the image evaluation according to the evaluation [4-4] was the rank D. The reason is considered to be because the amount of the electric discharge from the outer surface of the roller CA1 for electrophotography has run short.

Comparative Examples 2 to 5

[Preparation of Rubber Composition Ca2 to Ca5 for Forming Electro-Conductive Layer]

An unvulcanized domain rubber composition (CMB) and an unvulcanized matrix rubber composition (MRC) which had the compositions described in Table 8-1 were prepared in the same manner as in the [1-1] and [1-2] of Example 1, respectively.

The obtained CMB, MRC and the materials shown in Table 8-2 were mixed with compounding proportions shown in Table 8-2, in the same manner as in [1-3] of Example 1, and rubber compositions Ca2 to Ca5 for forming the respective electro-conductive layers were prepared.

TABLE 8-1

| Rubber composition for forming electro-conductive layer | Unvulcanized domain rubber composition (CMB) | | | | | | Unvulcanized matrix rubber composition (MRC) | | | | | | |
|---|---|---|---|---|---|---|---|---|---|---|---|---|---|
| | Second rubber | | Electro-conductive agent | | Zinc oxide | Zinc stearate | First rubber | | | Zinc oxide | Zinc stearate | Filler | |
| | Type of rubber | Abbreviated name | Abbreviated name | parts | parts | parts | Type | Abbreviated name | parts | parts | parts | Type | phr |
| Ca2 | EPDM | E505A | 100 | Ketjen | 10 | 5 | 2 | ECO | CG102 | 100 | 5 | 1 | #30 | 40 |
| Ca3 | NBR | DN302 | 100 | #5500 | 60 | 5 | 2 | SBR | A303 | 100 | 5 | 1 | #30 | 40 |
| Ca4 | NBR | N230SV | 100 | #7360 | 60 | 5 | 2 | SBR | T2003 | 100 | 5 | 1 | #7360 | 40 |
| Ca5 | SBR | T2003 | 100 | — | — | 5 | 2 | NBR | N230SV | 100 | 5 | 1 | #7360 | 60 |

TABLE 8-2

| Rubber composition for forming electro-conductive layer | CMB (parts by mass) | MRC (parts by mass) | Difference between SP values | Vulcanizing agent | | Vulcanization accelerator | |
|---|---|---|---|---|---|---|---|
| | | | | Type | phr | Type | phr |
| Ca2 | 32 | 68 | 2.5 | Sulfur | 3 | TBZTD | 1 |
| Ca3 | 30 | 70 | 1.4 | Sulfur | 3 | TBZTD | 1 |
| Ca4 | 25 | 75 | 3.0 | Sulfur | 3 | TBZTD | 1 |
| Ca5 | 25 | 75 | 3.0 | Sulfur | 3 | TBZTD | 1 |

In Table 8-2, the amounts of the compounding proportions (phr) of the vulcanizing agent and the vulcanization accelerator are the compounding proportions with respect to 100 parts by mass of the mixed rubber of the CMB and the MRC.

[Production of Electro-Conductive Rollers Ca2 to Ca5]

Electro-conductive rollers Ca2 to Ca5 were produced in the same manner as in Comparative Example 1, except that rubber compositions Ca2 to Ca5 for forming the respective electro-conductive layers were used.

[Preparation of Coating Liquid CS2 for Surface Layer]

A coating liquid of a binder resin for forming a surface layer was produced according to the following method. Under a nitrogen atmosphere, 100 parts by mass of acrylic polyol (DC2016, produced by Daicel Chemical Industries, Ltd.) was gradually added dropwise to 27 parts by mass of polymeric MDI (trade name: Millionate MR200, produced by Nippon Polyurethane Industry Co., Ltd.) in a reaction vessel while the temperature in the reaction vessel was kept at 65° C. After the end of the dropwise addition, the mixture was subjected to a reaction at a temperature of 65° C. for 2 hours. The obtained reaction mixture was cooled to room temperature, and an isocyanate-terminated prepolymer PC-1 was obtained in which a content of the isocyanate group was 4.3%.

In methyl ethyl ketone (MEK), 41 parts by mass of isocyanate-terminated prepolymer PC1, 59 parts by mass of Isocyanate A/Isocyanate B=4/3 (Vestanat B1370 produced by Evonik Degussa Co., Ltd./Duranate TPA-880E produced by Asahi Kasei Chemicals Corporation), and 20 parts by mass of a quaternary ammonium salt (trade name: ADK CIZER LV70, produced by ADEKA Co., Ltd.) as an ion conductive agent were dissolved, and the solid content was adjusted so as to become 27% by mass. In a glass bottle having an internal volume of 450 mL, 270 g of the mixed liquid and 200 g of glass beads having an average particle diameter of 0.8 mm were charged, and were dispersed with the use of a paint shaker disperser for 12 hours: and a coating liquid CS2 for the surface layer was obtained.

[Preparation of Coating Liquid CS3 for Forming Surface Layer]

A coating liquid CS3 for the surface layer was prepared in the same manner as the coating liquid CS2 for the surface layer, except that the amount of the ion conductive agent compounded in the coating liquid CS2 for the surface layer was set to 1 part by mass.

[Production of Roller CA2 for Electrophotography]

The electro-conductive roller Ca2 was surface-treated by heating at a temperature of 200° C. for 60 minutes, and a roller CA2 for electrophotography according to Comparative Example 2 was produced. The obtained roller CA2 for electrophotography was evaluated in the same manner as in Example 1.

The roller CA2 for electrophotography was subjected to surface treatment, and the volume resistivity of the electro-conductive layer decreased in the depth direction from the outer surface of the electro-conductive layer, and the region T was formed. However, the volume resistivity of the matrix is drastically smaller than $1.0 \times 10^{12}$ Ω·cm.

The rank of the image evaluation according to the evaluation [4-2] of the roller CA2 for electrophotography was the rank D. This is considered to be because the volume resistivity of the matrix is lower than $1.0 \times 10^{12}$ Ω·cm, and the wraparound of the electric charge occurred from the equipotential surface of the surface in the longitudinal direction region (region in which electric discharge occurred at the same time) in which the distance of the minute gap between the roller and the photosensitive drum was equal. In addition, the rank of the image evaluation according to the evaluation [4-4] was the rank D. This is considered to be because the volume resistivity of the matrix has been $1.0 \times 10^{12}$ Ωcm or smaller, the electric charge has moved in the matrix, and accordingly the matrix cannot have suppressed the acceleration of the electric charge.

[Production of Roller CA3 for Electrophotography]

The electro-conductive roller Ca3 was dipped (dipping) in the coating liquid CS2 for the surface layer, and then was pulled up, while the upper end thereof was held so that the longitudinal direction thereof became the vertical direction. The dipping time at the time of dipping was 9 seconds; and the pull-up speed of the roller was adjusted so that the initial speed was 30 mm/sec and the final speed was 3 mm/sec, and the speed was changed linearly with time in a period from 30 mm/sec to 3 mm/sec.

After the dip coating, the roller Ca3 was air-dried at a temperature of 23° C. for 30 minutes. Subsequently, the roller Ca3 was dried in a hot-air circulation drying machine at a temperature of 80° C. for 1 hour, was further dried at a temperature of 160° C. for 1 hour, and a surface layer was formed; and thereby a roller CA3 for electrophotography according to Comparative Example 3 was produced. The obtained roller CA3 for electrophotography was evaluated in the same manner as in Example 1. The roller CA3 for electrophotography according to the present Comparative Example is different from the roller for electrophotography according to the present disclosure, in a point that the electro-conductive layer does not constitute the outer surface of the roller for electrophotography and a resin layer having high electro-conductivity is provided as the surface layer.

The rank of the image evaluation according to the evaluation [4-2] of the roller CA3 for electrophotography was the rank D. The reason is considered to be because the outer surface of the roller CA3 for electrophotography has been formed of the surface layer having low volume resistivity, and accordingly, the wraparound of the electric charge cannot have been suppressed.

[Production of Roller CA4 for Electrophotography]

A roller CA4 for electrophotography according to Comparative Example 4 was produced in the same manner as the roller CA3 for electrophotography, except that the coating liquid CS3 for the surface layer was used. The obtained roller CA4 for electrophotography was evaluated in the same manner as in Example 1. The roller CA4 for electrophotography according to the present Comparative Example is different from the roller for electrophotography according to the present disclosure, in a point that the electro-conductive layer does not constitute the outer surface of the roller for electrophotography and a resin layer having low electro-conductivity is provided as the surface layer. The rank of the image evaluation according to the evaluation [4-4] of the roller CA4 for electrophotography was the rank D. The reason is considered to be because the outer surface of the roller CA4 for electrophotography has been formed of the surface layer having low electro-conductivity, and the amount of the electric discharge from the outer surface has run short.

[Production of Roller CA5 for Electrophotography]

The electro-conductive roller Ca3 was determined to be used as a roller CA5 for electrophotography according to Comparative Example 5, without being treated, and was subjected to the same evaluation as in Example 1. The roller CA5 for electrophotography was not subjected to the measurement of the volume resistivity according to the evaluations [3-6] and [3-7], because the electro-conductive layer was not subjected to the surface treatment, and accordingly the region T did not exist in the electro-conductive layer.

The rank of the image evaluation according to the evaluation [4-2] of the roller CA5 for electrophotography was the rank D. The reason is considered to be because the electro-conductive layer of the roller CA5 for electrophotography has not had the region T, and cannot have suppressed the acceleration of the electric charge which has moved between domains.

[Production of Roller CA6 for Electrophotography]

A roller CA6 for electrophotography according to Comparative Example 6 was produced in the same manner as the roller CA2 for electrophotography, except that the electro-conductive roller Ca4 was used. The obtained roller CA6 for electrophotography was evaluated in the same manner as in Example 1. In the roller CA6, the surface treatment was performed, but an increase in volume resistivity from the outer surface of the electro-conductive layer to the depth direction was observed, because an electro-conductive agent was contained in the matrix. The reason is considered to be because the distance between the electro-conductive agents on the surface becomes closer, as the degree of crosslinking of the matrix increases and shrinks at the time of the surface treatment.

In addition, the rank of the image evaluation according to the evaluation [4-2] of the roller CA6 for electrophotography was the rank D. The reason is considered to be because the roller CA6 cannot have suppressed the acceleration of the electric charge which has moved between domains. In addition, the rank of the image evaluation according to the evaluation [4-4] was the rank D. This is considered to be because the volume resistivity of the matrix has been $1.0 \times 10^{12}$ Ω·cm or smaller, and accordingly the matrix cannot have accumulated sufficient electric charges in the domain.

[Production of Roller CA7 for Electrophotography]

A roller CA7 for electrophotography according to Comparative Example 7 was produced in the same manner as the roller CA2 for electrophotography, except that the electro-conductive roller Ca5 for electrophotography was used. The obtained roller CA7 for electrophotography was evaluated in the same manner as in Example 1.

The rank of the image evaluation according to the evaluation [4-2] of the roller CA7 for electrophotography was the rank D. The reason is considered to be because the roller CA7 for electrophotography cannot have suppressed the acceleration of the electric charge, because the matrix contains an electro-conductive agent and the electric charge moves in the matrix, similarly to the roller CA6 for electrophotography. In addition, the rank of the image evaluation according to the evaluation [4-4] of the roller CA7 for electrophotography was the rank D. The reason is considered to be because the amount of the electric discharge from the outer surface of the roller CA7 for electrophotography has run short, because the domain in the electro-conductive layer of the roller CA7 for electrophotography does not have contained an electron conductive agent.

The configuration and surface treatment conditions of the roller for electrophotography according to Comparative Examples 1 to 7 are summarized in Table 9.

The evaluation results of Comparative Examples 1 to 7 are shown in Tables 10-1 to 10-2.

TABLE 9

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Electrophotographic roller | CA1 | CA2 | CA3 | CA4 | CA5 | CA6 | CA7 |
| Electro-conductive roller No. | Ca1 | Ca2 | Ca3 | Ca3 | Ca3 | Ca4 | Ca5 |
| Coating liquid for surface layer | CS1 | — | CS2 | CS3 | — | — | — |
| Surface treatment conditions (temperature, time) | 160° C. 30 minutes | 200° C. 60 minutes | 160° C. 60 minutes | 160° C. 60 minutes | Absent | 200° C. 60 minutes | 200° C. 60 minutes |

TABLE 10-1

|  |  | 3-1 Presence or absence of M-D structure | 3-2 Domain D (μm) | 3-3 Inter-domain distance (μm) | 3-4 Matrix volume resistivity (Ω·cm) | 3-5 Domain volume resistivity (Ω·cm) | 3-6 Thickness t (μm) of region T | 3-7 R1 volume resistivity (Ω·cm) | 3-7 r1 volume resistivity (Ω·cm) | 3-7 R2 volume resistivity (Ω·cm) | 3-7 r2 volume resistivity (Ω·cm) | 3-7 Existence of region T | 3-8 Domain volume fraction p (%) |
|---|---|---|---|---|---|---|---|---|---|---|---|---|---|
| Comparative Example | 1 | Absent | — | — | 4.14E+07 | — | — | — | — | — | — | N | — |
|  | 2 | Present | 1.7 | 1.5 | 1.44E+07 | 3.89E+04 | 119 | 2.67E+09 | 6.80E+03 | 1.47E+07 | 3.96E+04 | Y | 31.3 |
|  | 3 | Present | 2.2 | 1.4 | 6.77E+12 | 4.03E+02 | — | — | — | — | — | N | 33.3 |
|  | 4 | Present | 2.2 | 1.9 | 6.70E+12 | 4.08E+00 | — | — | — | — | — | N | 33.3 |
|  | 5 | Present | 2.3 | 2.2 | 6.39E+12 | 4.13E+02 | — | — | — | — | — | N | 33.3 |
|  | 6 | Present | 2.5 | 1.3 | 1.87E+07 | 1.48E+03 | — | — | — | — | — | N | 21.9 |
|  | 7 | Present | 2.5 | 2.1 | 1.01E+03 | 4.20E+12 | — | — | — | — | — | N | 22.3 |

TABLE 10-2

|  |  | 4-1 Leak resistance Voltage (V) | 4-2 Leak resistance Rank of image evaluation | 4-3 Charging performance Ratio of downstream electric discharge | 4-4 Charging performance Rank of image evaluation |
|---|---|---|---|---|---|
| Comparative Example | 1 | 1300 | C | 3.56.E-01 | D |
|  | 2 | 1200 | D | 5.62.E-01 | D |
|  | 3 | 1000 | D | 1.32.E-01 | C |
|  | 4 | 1500 | B | 7.66.E-01 | D |
|  | 5 | 1300 | D | 2.68.E-01 | C |
|  | 6 | 1100 | D | 4.76.E-01 | D |
|  | 7 | 1100 | D | 5.73.E-01 | D |

According to one aspect of the present disclosure, there can be provided an electro-conductive member that can achieve both of suppression of an abnormal electric discharge due to a concentration of an electric field and a lateral black band image in a defect such as a flaw of a photosensitive drum, even when an applied voltage is increased in order to cope with speedup, and the electro-conductive member has been used for a long period of time, and at the same time, suppression of occurrence of image defects such as a charged lateral streak image due to lack of charging.

According to another aspect of the present disclosure, a process cartridge can be obtained that contributes to the formation of a high-quality electrophotographic image. According to further another aspect of the present disclosure, an electrophotographic image forming apparatus can be obtained that can form the high-quality electrophotographic image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An electro-conductive member for electrophotography, comprising:
   a support having an electro-conductive outer surface; and
   an electro-conductive layer on the outer surface of the support, the electro-conductive layer comprising a matrix having domains dispersed therein;
   the matrix containing a first crosslinked rubber product and having a volume resistivity greater than $1.0 \times 10^{12}$ Ωcm; and
   the domains including a second crosslinked rubber product and an electron conductive agent, wherein
   the electro-conductive layer includes a region T in which the volume resistivity of the matrix decreases in a depth direction from the outer surface of the electro-conductive member, and in which the volume resistivity of the domains increases from the outer surface toward the depth direction.

2. The electro-conductive member according to claim 1, wherein a thickness t of region T is 20 to 200 μm.

3. The electro-conductive member for electrophotography according to claim 2, wherein R1/r1>R2/r2 when R1 (Ωcm) represents the volume resistivity of the matrix in a first thickness region having a depth of 5 to 6 μm from the outer surface of the electro-conductive layer, r1 (Ωcm) represents the volume resistivity of the domains included in the first thickness region, R2 (Ωcm) represents the volume resistivity of the matrix in a second thickness region having a depth of t-1 to t μm from the outer surface of the electro-conductive layer, and r2 (Ωcm) represents the volume resistivity of the domains included in the second region.

4. The electro-conductive member according to claim 1, wherein the volume resistivity pd of the domains existing in the electro-conductive layer is $1.0 \times 10^1$ to $1.0 \times 10^4$ Ωcm.

5. The electro-conductive member according to claim 1, wherein a volume fraction p of the domains existing in the electro-conductive layer is 15 to 40%.

6. A process cartridge for electrophotography configured to be detachably attachable to a main body of an electrophotographic image forming apparatus, comprising an electro-conductive member for electrophotography, comprising:
 a support having an electro-conductive outer surface; and
 an electro-conductive layer on the outer surface of the support, the electro-conductive layer comprising a matrix having domains dispersed therein;
 the matrix containing a first crosslinked rubber product and having a volume resistivity greater than $1.0 \times 10^{12}$ Ωcm; and
 the domains including a second crosslinked rubber product and an electron conductive agent, wherein
 the electro-conductive layer includes a region T in which the volume resistivity of the matrix decreases in a depth direction from the outer surface of the electro-conductive member, and in which the volume resistivity of the domains increases from the outer surface toward the depth direction.

7. An electrophotographic image forming apparatus comprising an electro-conductive member for electrophotography, comprising:
 a support having an electro-conductive outer surface; and
 an electro-conductive layer provided on the outer surface of the support, the electro-conductive layer comprising a matrix having a plurality of domains dispersed therein;
 the matrix containing a first crosslinked rubber product and having a volume resistivity greater than $1.0 \times 10^{12}$ Ωcm; and
 the domains including a second crosslinked rubber product and an electron conductive agent, wherein
 the electro-conductive layer includes a region T in which the volume resistivity of the matrix decreases in a depth direction from the outer surface of the electro-conductive member, and in which the volume resistivity of the domains increases from the outer surface toward the depth direction.

8. The electro-conductive member according to claim 1, wherein the matrix does not almost contain the electron conductive agent.

\* \* \* \* \*